US012177054B2

(12) United States Patent
Lei et al.

(10) Patent No.: US 12,177,054 B2
(45) Date of Patent: Dec. 24, 2024

(54) PEAK-TO-AVERAGE POWER RATIO MANAGEMENT FOR RELAYED COMMUNICATIONS

(71) Applicant: QUALCOMM Incorporated, San Diego, CA (US)

(72) Inventors: Jing Lei, San Diego, CA (US); Wei Yang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/567,687

(22) Filed: Jan. 3, 2022

(65) Prior Publication Data

US 2022/0286339 A1 Sep. 8, 2022

Related U.S. Application Data

(60) Provisional application No. 63/157,608, filed on Mar. 5, 2021.

(51) Int. Cl.
*H04L 27/26* (2006.01)
*H04W 72/23* (2023.01)

(52) U.S. Cl.
CPC ........ *H04L 27/2618* (2013.01); *H04L 27/262* (2013.01); *H04W 72/23* (2023.01)

(58) Field of Classification Search
CPC ... H04L 27/2618; H04L 27/262; H04W 72/23
See application file for complete search history.

(56) References Cited

U.S. PATENT DOCUMENTS

2012/0224570 A1* 9/2012 Seok ................... H04L 27/2613
2015/0333946 A1* 11/2015 Terry ..................... H04W 24/08
(Continued)

OTHER PUBLICATIONS

Bai G., et al., "Golay Complementary Sequences and Reed-Muller Codes Based PAPA Reduction for Relay Networks with Superimposed Training", Signal Processing (ICSP), 2012 IEEE 11Th International Conference on, IEEE, Oct. 21, 2012 (Oct. 21, 2012), pp. 1558-1561, XP032353533, DOI: 10.1109/ICOSP.2012.6491871 ISBN: 978-1-4673-2196-9, p. 1558-p. 1559.
(Continued)

*Primary Examiner* — Ronald B Abelson
(74) *Attorney, Agent, or Firm* — QUALCOMM Incorporated

(57) ABSTRACT

Methods, systems, and devices for wireless communications are described. PAPR may be relevant to managing transmitter power, receiver sensitivity, or both, and transmissions of a particular device may consider various PAPR reduction strategies to manage transmission power at the device. However, relay devices may be configured to forward communications from multiple transmitting devices, and PAPR may not be considered for aggregate signaling via such a relay device. In some examples of the described PAPR management techniques, assisting transmitters may be configured to transmit PAPR reduction signaling that may be received by a relay device, such that an aggregated signal that is received and forwarded by the relay device may have lower PAPR. Additionally, or alternatively, in some examples of the described PAPR management techniques, a relay device itself may inject PAPR reduction signaling into a received signal to reduce PAPR of a transmission by the relay device.

22 Claims, 20 Drawing Sheets

(56) References Cited

U.S. PATENT DOCUMENTS

| | | | | |
|---|---|---|---|---|
| 2016/0373283 | A1* | 12/2016 | Zeng | H04L 27/2623 |
| 2017/0230961 | A1* | 8/2017 | Park | H04W 72/23 |
| 2020/0007372 | A1* | 1/2020 | Shen | H04L 27/2615 |
| 2020/0112467 | A1* | 4/2020 | Shen | H04L 5/0044 |
| 2020/0412590 | A1* | 12/2020 | Akkarakaran | H04L 27/26136 |
| 2022/0060363 | A1* | 2/2022 | Shattil | H04B 7/0465 |
| 2022/0070836 | A1* | 3/2022 | Balasubramanian | H04J 11/004 |
| 2022/0132482 | A1* | 4/2022 | Gokceli | H04W 72/044 |
| 2022/0167269 | A1* | 5/2022 | Horn | H04W 52/365 |
| 2022/0217756 | A1* | 7/2022 | Wu | H04L 5/0055 |

OTHER PUBLICATIONS

International Search Report and Written Opinion—PCT/US2022/070016—ISA/EPO—Apr. 22, 2022 (2103291WO).

Kim Y-J., et al., "An Effective PAPR Reduction of SFBC-OFDM for Multinode Cooperative Transmission", IEEE Signal Processing Letters, IEEE, USA, vol. 16, No. 11, Nov. 1, 2009 (Nov. 1, 2009), pp. 925-928, XP011270211, ISSN: 1070-9908, DOI: 10.1109/LSP.2009.2027154, p. 925.

Yang S., et al., "An Energy Efficient PTS Scheme for PAPR Reduction in OFDM Relay Systems", 2015 10Th International Conference on Communications and Networking in China (Chinacom), IEEE, Aug. 15, 2015 (Aug. 15, 2015), pp. 858-863, XP032915276, DOI: 10.1109/CHINACOM.2015.7498057 [retrieved on Jun. 22, 2016], p. 858-p. 862.

Yang W., et al., "Channel Estimation for Two-Way Relay OFDM Networks", Eurasip Journal on Wireless Communications and Networking, vol. 2010, No. 1, Dec. 1, 2010 (Dec. 1, 2010), 6 Pages, XP055911586, 001: 10.1155/2010/186182 Retrieved from the Internet: URL:https://link.springer.com/content/pdf/10.1155/2010/186182.pdf, p. 1.

* cited by examiner

PEAK-TO-AVERAGE POWER RATIO MANAGEMENT FOR RELAYED COMMUNICATIONS

CROSS REFERENCE

The present application for patent claims the benefit of U.S. Provisional Patent Application No. 63/157,608 by LEI et al., entitled "PEAK-TO-AVERAGE POWER RATIO MANAGEMENT FOR RELAYED COMMUNICATIONS," filed Mar. 5, 2021, assigned to the assignee hereof, and expressly incorporated by reference herein.

FIELD OF TECHNOLOGY

The following relates to wireless communications, including peak-to-average power ratio management for relayed communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications may utilize one or more relay devices between communicating devices, where a relay device may be configured to receive a payload or signals and forward the received payload or signals to another device. In some examples, a relay device may perform filtering, frequency conversion, or amplification, or various combinations thereof, such that a payload or signal that is forwarded by a relay device is relatively or substantially unchanged compared to a received payload or signal. In some examples, a relay device may perform signal processing such as demodulation, decoding, switching, routing, coding, or modulation, or various combinations thereof, such that a payload or signal that is transmitted by a relay device may be relatively or substantially different than (e.g., reformatted from) a payload or signal that is received by the relay device.

SUMMARY

The described techniques relate to improved methods, systems, devices, and apparatuses that support peak-to-average power ratio (PAPR) management for relayed communications. In some examples, PAPR may be relevant to managing transmitter power, receiver sensitivity, or both, and transmissions of a particular device (e.g., transmissions of a particular user equipment (UE)) may consider various PAPR reduction strategies to manage transmission power at the device. However, relay devices may be configured to forward communications from multiple transmitting devices (e.g., multiple UEs). Thus, although transmissions of a particular device may consider PAPR for the particular device, PAPR may not be considered for the aggregate or composite communications via a relay device that forwards communications from multiple devices. Thus, PAPR for reception or transmission may be relatively high for a relay device despite PAPR being managed at a device level (e.g., at a UE level), which may degrade performance, efficiency, or other aspects of relayed communications.

In accordance with examples as disclosed herein, various devices in a wireless communication system may be configured to support PAPR reduction signaling for relayed communications. In some examples, a relay device may be configured as a simple receive-and-forward device, such as a satellite or other relay that does not perform signal modification or processing. In such examples, one or more assisting transmitters (e.g., an assisting UE) may be configured to transmit PAPR reduction signaling that may be received by a relay device. When combined with uplink communications from a set of transmitting devices (e.g., a set of transmitting UEs), such as a signal combination over a transmission or signal propagation medium, the aggregated signal that is received and forwarded by the relay may have lower PAPR than when such PAPR reduction signaling is not transmitted by an assisting transmitter. Additionally, or alternatively, a relay device may perform certain processing or multiplexing operations, and may inject or otherwise multiplex signaling into a received signal to reduce PAPR of a transmission by the relay device (e.g., based on a PAPR evaluation of received signaling, before forwarding). According to these and other techniques for PAPR reduction, relayed communications may be configured with a lower peak power, or otherwise improved signaling, which may improve various operations of a wireless communication system.

A method for wireless communication is described. The method may include evaluating, at a network node, PAPR for communications from a set of UEs for a time interval, where the set of UEs communicate with the network node via a relay device, and transmitting, by the network node and to a transmitting device, an indication of a configuration for PAPR reduction signals that is based on evaluating the PAPR.

An apparatus for wireless communication is described. The apparatus may include a processor, memory coupled with the processor, and instructions stored in the memory. The instructions may be executable by the processor to cause the apparatus to evaluate, at a network node, PAPR for communications from a set of UEs for a time interval, where the set of UEs communicate with the network node via a relay device, and transmit, by the network node and to a transmitting device, an indication of a configuration for PAPR reduction signals that is based on evaluating the PAPR.

Another apparatus for wireless communication is described. The apparatus may include means for evaluating, at a network node, PAPR for communications from a set of UEs for a time interval, where the set of UEs communicate with the network node via a relay device, and means for transmitting, by the network node and to a transmitting device, an indication of a configuration for PAPR reduction signals that is based on evaluating the PAPR.

A non-transitory computer-readable medium storing code for wireless communication is described. The code may include instructions executable by a processor to evaluate, at a network node, PAPR for communications from a set of UEs for a time interval, where the set of UEs communicate with the network node via a relay device, and transmit, by the network node and to a transmitting device, an indication of a configuration for PAPR reduction signals that is based on evaluating the PAPR.

In some examples of the method, apparatuses, and non-transitory computer-readable medium described herein, evaluating PAPR for the communications from the set of UEs may include operations, features, means, or instructions for evaluating PAPR for a composite signal that includes respective communications from each UE of the set of multiple UEs for the time interval, and transmitting the indication of the configuration for PAPR reduction signals may include operations, features, means, or instructions for transmitting an indication of a cell-specific or group-specific PAPR reduction scheme based on evaluating PAPR for the composite signal.

Some examples of the method, apparatuses, and non-transitory computer-readable medium described herein may further include operations, features, means, or instructions for transmitting, to the transmitting device, a request for capability information associated with support of PAPR reduction, and the configuration for PAPR reduction signals may be based on a response to the request for capability information associated with support of PAPR reduction.

In some examples of the method, apparatuses, and non-transitory computer-readable medium described herein, transmitting the indication of the configuration for PAPR reduction signals may include operations, features, means, or instructions for transmitting, to one or more UEs of the set of UEs, an indication of PAPR reduction signals for transmission during the time interval by the one or more UEs of the set of UEs.

Some examples of the method, apparatuses, and non-transitory computer-readable medium described herein may further include operations, features, means, or instructions for transmitting, to each UE of the one or more UEs, a first uplink grant associated with a portion of the communications from the each UE for the time interval and a second uplink grant including the indication of PAPR reduction signals for transmission during the time interval.

In some examples of the method, apparatuses, and non-transitory computer-readable medium described herein, the first uplink grant may be configurable to indicate a first transmission power for the each UE, and the second uplink grant may be configurable to indicate a second transmission power for the each UE that is different than the first transmission power and a rate matching pattern associated with a PAPR reduction signal.

In some examples of the method, apparatuses, and non-transitory computer-readable medium described herein, transmitting the indication of the configuration for PAPR reduction signals may include operations, features, means, or instructions for transmitting, to one or more UEs not included in the set of UEs, an indication of PAPR reduction signals for transmission during the time interval by the one or more UEs not included in the set of UEs.

In some examples of the method, apparatuses, and non-transitory computer-readable medium described herein, transmitting the indication of the configuration for PAPR reduction signals may include operations, features, means, or instructions for transmitting, to a set of multiple UEs, an indication of PAPR reduction signals for transmission during the time interval by each of the set of multiple UEs using a same resource in the time domain and frequency domain.

In some examples of the method, apparatuses, and non-transitory computer-readable medium described herein, transmitting the indication of the configuration for PAPR reduction signals may include operations, features, means, or instructions for transmitting, to the relay device, an indication of PAPR reduction signals for transmission during the time interval by the relay device.

In some examples of the method, apparatuses, and non-transitory computer-readable medium described herein, the configuration for PAPR reduction signals may be based on a bandwidth of the communications from the set of UEs.

In some examples of the method, apparatuses, and non-transitory computer-readable medium described herein, the configuration for PAPR reduction signals may be based on a transmission bandwidth of the relay device.

In some examples of the method, apparatuses, and non-transitory computer-readable medium described herein, the configuration for PAPR reduction signals may be based on a PAPR reduction or a PAPR target for a transmission by the relay device, or a PAPR reduction or a PAPR target for a reception by the relay device, or a combination thereof.

In some examples of the method, apparatuses, and non-transitory computer-readable medium described herein, the configuration for PAPR reduction signals may indicate a frequency resource that is not used for the communications from the set of UEs.

In some examples of the method, apparatuses, and non-transitory computer-readable medium described herein, the configuration for PAPR reduction signals may be based on a numerology, a waveform, an adjacent channel leakage ratio, a guard band configuration, a UE capability indication, a UE power class, a bandwidth of an active bandwidth part, a number of transmit antennas, or a combination thereof.

Some examples of the method, apparatuses, and non-transitory computer-readable medium described herein may further include operations, features, means, or instructions for receiving, from the relay device, signals including the communications from the UEs and one or more PAPR reduction signals in accordance with the indicated configuration.

Some examples of the method, apparatuses, and non-transitory computer-readable medium described herein may further include operations, features, means, or instructions for demultiplexing communications signaling associated with the communications from the received signals, and processing the communications signaling independent of the one or more PAPR reduction signals to obtain data streams, control information, reference signals, or a combination thereof from the set of UEs.

A method for wireless communication is described. The method may include receiving, at a relay device and from a network node, an indication of a PAPR reduction configuration, receiving, at the relay device and from a set of one or more UEs, communications to be forwarded by the relay device, generating a PAPR reduction signal based on the PAPR reduction configuration, and transmitting signaling including the communications and the generated PAPR reduction signal.

An apparatus for wireless communication is described. The apparatus may include a processor, memory coupled with the processor, and instructions stored in the memory. The instructions may be executable by the processor to cause the apparatus to receive, at a relay device and from a network node, an indication of a PAPR reduction configuration, receive, at the relay device and from a set of one or more UEs, communications to be forwarded by the relay device, generate a PAPR reduction signal based on the PAPR reduction configuration, and transmit signaling including the communications and the generated PAPR reduction signal.

Another apparatus for wireless communication is described. The apparatus may include means for receiving, at a relay device and from a network node, an indication of a PAPR reduction configuration, means for receiving, at the relay device and from a set of one or more UEs, communications to be forwarded by the relay device, means for generating a PAPR reduction signal based on the PAPR reduction configuration, and means for transmitting signaling including the communications and the generated PAPR reduction signal.

A non-transitory computer-readable medium storing code for wireless communication is described. The code may include instructions executable by a processor to receive, at a relay device and from a network node, an indication of a PAPR reduction configuration, receive, at the relay device and from a set of one or more UEs, communications to be forwarded by the relay device, generate a PAPR reduction signal based on the PAPR reduction configuration, and transmit signaling including the communications and the generated PAPR reduction signal.

In some examples of the method, apparatuses, and non-transitory computer-readable medium described herein, receiving the indication of the PAPR reduction configuration may include operations, features, means, or instructions for receiving an indication of a frequency resource allocated for PAPR reduction signals, and generating the PAPR reduction signal may include operations, features, means, or instructions for generating the PAPR reduction signal for transmission using the frequency resource.

Some examples of the method, apparatuses, and non-transitory computer-readable medium described herein may further include operations, features, means, or instructions for receiving, from the network node, a request for capability information associated with support of PAPR reduction and transmitting, to the network node, a response indicating a capability of the relay device to support the PAPR reduction, and receiving the indication of the PAPR reduction configuration may be based on the response.

Some examples of the method, apparatuses, and non-transitory computer-readable medium described herein may further include operations, features, means, or instructions for evaluating, at the relay device, PAPR of the received communications to be forwarded by the relay device, and generating the PAPR reduction signal based on evaluating PAPR of the received communications.

In some examples of the method, apparatuses, and non-transitory computer-readable medium described herein, receiving the indication of the PAPR reduction configuration may include operations, features, means, or instructions for receiving a command to multiplex PAPR reduction signals with the communications to be forwarded by the relay device.

In some examples of the method, apparatuses, and non-transitory computer-readable medium described herein, the command may include an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

Some examples of the method, apparatuses, and non-transitory computer-readable medium described herein may further include operations, features, means, or instructions for multiplexing the communications with the generated PAPR reduction signal, and transmitting the signaling may include transmitting the multiplexed communications and generated PAPR reduction signal.

A method for wireless communication is described. The method may include receiving, at a UE, a command from a network node to perform a PAPR reduction transmission to a relay device, generating a PAPR reduction signal for a time interval based on the received command, and transmitting the generated PAPR reduction signal to the relay device during the time interval.

An apparatus for wireless communication is described. The apparatus may include a processor, memory coupled with the processor, and instructions stored in the memory. The instructions may be executable by the processor to cause the apparatus to receive, at a UE, a command from a network node to perform a PAPR reduction transmission to a relay device, generate a PAPR reduction signal for a time interval based on the received command, and transmit the generated PAPR reduction signal to the relay device during the time interval.

Another apparatus for wireless communication is described. The apparatus may include means for receiving, at a UE, a command from a network node to perform a PAPR reduction transmission to a relay device, means for generating a PAPR reduction signal for a time interval based on the received command, and means for transmitting the generated PAPR reduction signal to the relay device during the time interval.

A non-transitory computer-readable medium storing code for wireless communication is described. The code may include instructions executable by a processor to receive, at a UE, a command from a network node to perform a PAPR reduction transmission to a relay device, generate a PAPR reduction signal for a time interval based on the received command, and transmit the generated PAPR reduction signal to the relay device during the time interval.

Some examples of the method, apparatuses, and non-transitory computer-readable medium described herein may further include operations, features, means, or instructions for receiving, from the network node, a request for capability information associated with support of PAPR reduction and transmitting, to the network node, a response indicating a capability of the UE to support the PAPR reduction, and receiving the command to perform the PAPR reduction transmission may be based on transmitting the response.

Some examples of the method, apparatuses, and non-transitory computer-readable medium described herein may further include operations, features, means, or instructions for receiving, at the UE, a first uplink grant associated with uplink communications from the UE to the relay device and a second uplink grant including the command to perform a PAPR reduction transmission to the relay device, and transmitting, to the relay device, the generated PAPR reduction signal concurrently with the uplink communications.

In some examples of the method, apparatuses, and non-transitory computer-readable medium described herein, the first uplink grant may indicate a first transmission power for communications from the UE to the relay device and the second uplink grant may indicate a second transmission power for the generated PAPR reduction signal that is different than the first transmission power.

In some examples of the method, apparatuses, and non-transitory computer-readable medium described herein, the time interval may be not associated with uplink communications from the UE to the relay device.

In some examples of the method, apparatuses, and non-transitory computer-readable medium described herein, the command may include an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

DETAILED DESCRIPTION

Figure 1:
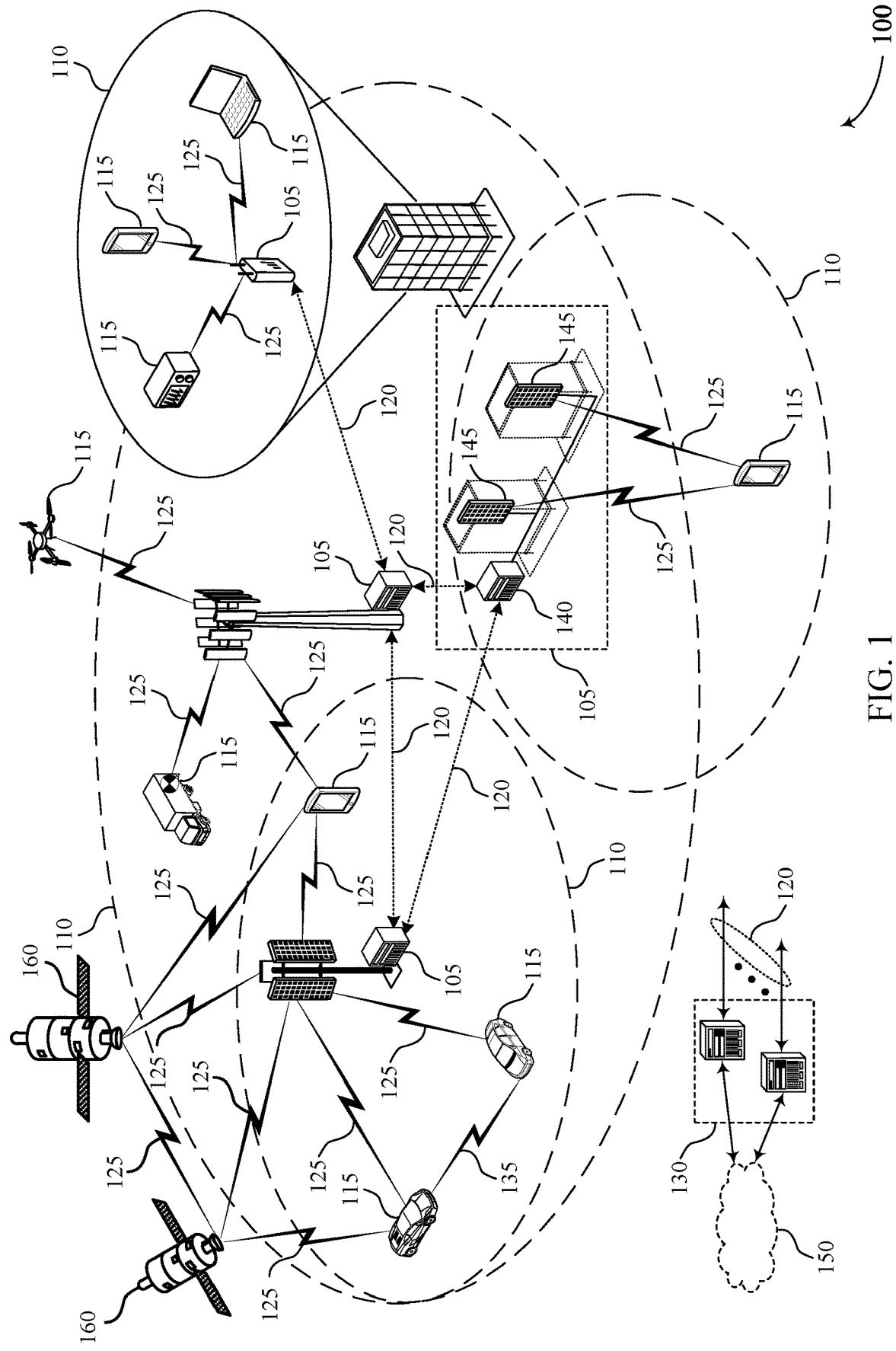
FIG. 1 illustrates an example of a wireless communications system that supports PAPR management for relayed communications in accordance with aspects of the present disclosure.

The described techniques relate to improved methods, systems, devices, and apparatuses that support peak-to-average power ratio (PAPR) management for relayed communications. In some examples, PAPR may be relevant to managing transmitter power, receiver sensitivity, or both, and transmissions of a particular device (e.g., transmissions of a particular user equipment (UE)) may consider various PAPR reduction strategies to manage transmission power at the device. However, relay devices may be configured to forward communications from multiple transmitting devices (e.g., multiple UEs). Thus, although transmissions of a particular device may consider PAPR for the particular device, PAPR may not be considered for the aggregate or composite communications via a relay device that forwards communications from multiple devices. Thus, PAPR for reception or transmission may be relatively high for a relay device despite PAPR being managed at a device level (e.g., at a UE level), which may degrade performance, efficiency, or other aspects of at least such a relay device.

In accordance with examples as disclosed herein, various devices in a wireless communication system may be configured to support PAPR reduction signaling for relayed communications. In some examples, a relay device may be configured as a simple receive-and-forward device, such as a satellite or other relay that does not perform signal modification or processing. In such examples, one or more assisting transmitters (e.g., an assisting UE) may be configured to transmit PAPR reduction signaling that may be received by a relay device. When combined with uplink communications from a set of transmitting devices (e.g., a set of transmitting UEs), such as a signal combination over a transmission or signal propagation medium, the aggregated signal that is received and forwarded by the relay may have lower PAPR than when such PAPR reduction signaling is not transmitted by an assisting transmitter. Additionally, or alternatively, a relay device may perform certain processing or multiplexing operations, and may inject or otherwise multiplex signaling into a received signal to reduce PAPR of a transmission by the relay device (e.g., based on a PAPR evaluation of received signaling, before forwarding). According to these and other techniques for PAPR reduction, relayed communications may be configured with a lower peak power, or otherwise improved signaling, which may improve various operations of a wireless communication system.

Aspects of the disclosure are initially described in the context of a wireless communications system, including various devices and configurations that may support relayed communications. Aspects of the disclosure are further illustrated and described with reference to with resources and operations that support PAPR reduction techniques for relayed communications. Aspects of the disclosure are further illustrated by and described with reference to apparatus diagrams, system diagrams, and flowcharts that relate to PAPR management for relayed communications.

FIG. 1 illustrates an example of a wireless communications system 100 that supports PAPR management for relayed communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate directly or indirectly with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105. In some examples, a D2D communication link 135 may support relayed communications.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may also include one or more satellites 160 (e.g., in a non-terrestrial network (NTN) configuration), which may communicate with base stations 105 or the core network 130 via gateways (e.g., ground-based terminals, NTN gateways). Satellites 160 may also communicate with UEs 115, which may include other high altitude or terrestrial communications devices. In various examples, a satellite 160 itself may be an example of a base station 105 (e.g., supporting a gNB processed payload), or a satellite 160 may provide a relay of signals between a base station 105 and UEs 115 (e.g., in a transparent satellite configuration, where a satellite 160 and a gateway may be configured together as a remote radio unit). A satellite 160 may be any suitable type of communication satellite configured to relay or otherwise support communications between different devices in the wireless communications system 100. A satellite 160 may be an example of a space satellite, a balloon, a dirigible, an airplane, a drone, an unmanned aerial vehicle (UAV), an unmanned aerial system (UAS), or other vehicle which may support communications from a generally non-terrestrial, overhead, or elevated position. In some examples, a satellite 160 may be in a geosynchronous or geostationary earth orbit, a low earth orbit, or a medium earth orbit. A satellite 160 may be a multi-beam satellite configured to provide service for multiple service beam coverage areas in a configured geographical service area. The satellite 160 may be any distance away from the surface of the earth or other reference surface.

In some examples, a cell may be provided or established by a satellite 160 as part of a non-terrestrial network. A satellite 160 may, in some cases, perform the functions of a base station 105 (e.g., having all or part of the functions of a base station 105 on board the satellite 160), act as a bent-pipe satellite, or act as a regenerative satellite, or a combination thereof. In some examples, a satellite 160 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration or transparent payload configuration, a satellite 160 may be configured to receive signals from ground stations (e.g., gateways, base stations 105, a core network 130) and transmit those signals to different ground stations or terminals (e.g., UEs 115, base stations 105). In some cases, a satellite 160 supporting a bent-pipe transponder configuration or transparent payload may filter or amplify signals or shift from uplink frequencies to downlink frequencies (e.g., in a frequency conversion operation), though a waveform signal repeated by the payload may be unchanged. In some examples, a satellite 160 supporting a regenerative transponder configuration may relay signals like a bent-pipe transponder configuration, but may also use on-board processing to perform other functions. Examples of these other functions may include demodulating a received signal, decoding a received signal, multiplexing signals (e.g., across a frequency band, across different time intervals), switching or routing signals, re-encoding a signal to be transmitted, or modulating the signal to be transmitted, or a combination thereof. In some examples, a satellite 160 supporting a bent pipe transponder configuration or regenerative transponder configuration may receive a signal from a base station 105 and may relay the signal to a UE 115 or base station 105, or vice-versa.

In some examples, PAPR may be relevant to managing transmitter power, receiver sensitivity, or both, and transmissions of a particular device (e.g., transmissions of a UE 115, transmissions of a base station 105, transmissions of a satellite 160) may consider various PAPR reduction strategies to manage transmission power at the device. However, a relay device of the wireless communications system 100 may be configured to forward communications from multiple transmitting devices. Thus, although transmissions of a particular device may consider PAPR for the particular device, PAPR may not be considered for the aggregate or composite communications via a relay device that forwards communications from multiple devices. Thus, PAPR for reception or transmission may be relatively high for a relay device despite PAPR being managed at a device level, which may degrade performance, efficiency, or other aspects of at least such a relay device.

In accordance with examples as disclosed herein, various devices in the wireless communications system 100 may be configured to support PAPR reduction signaling for relayed communications. In some examples, a relay device may be configured as a simple receive-and-forward device, such as a regenerative satellite 160 or other relay device (e.g., an IAB relay device) that does not perform signal modification or processing. In such examples, one or more assisting transmitters may be configured to transmit PAPR reduction signaling that may be received by a relay device. When combined with uplink communications from a set of transmitting devices, such as a signal combination over a transmission or signal propagation medium, the aggregated signal that is received and forwarded by the relay device may have lower PAPR than when such PAPR reduction signaling is not transmitted by an assisting transmitter. Additionally, or alternatively, a relay device may perform certain processing or multiplexing operations (e.g., in a smart satellite configuration, in a smart relay configuration), and may inject or otherwise multiplex signaling into a received signal to reduce PAPR of a transmission by the relay device (e.g., based on a PAPR evaluation of received signaling, before forwarding). According to these and other techniques for PAPR reduction, relayed communications may be configured with a lower peak power, or otherwise improved signaling, which may improve various operations of a wireless communication system.

Figure 2:
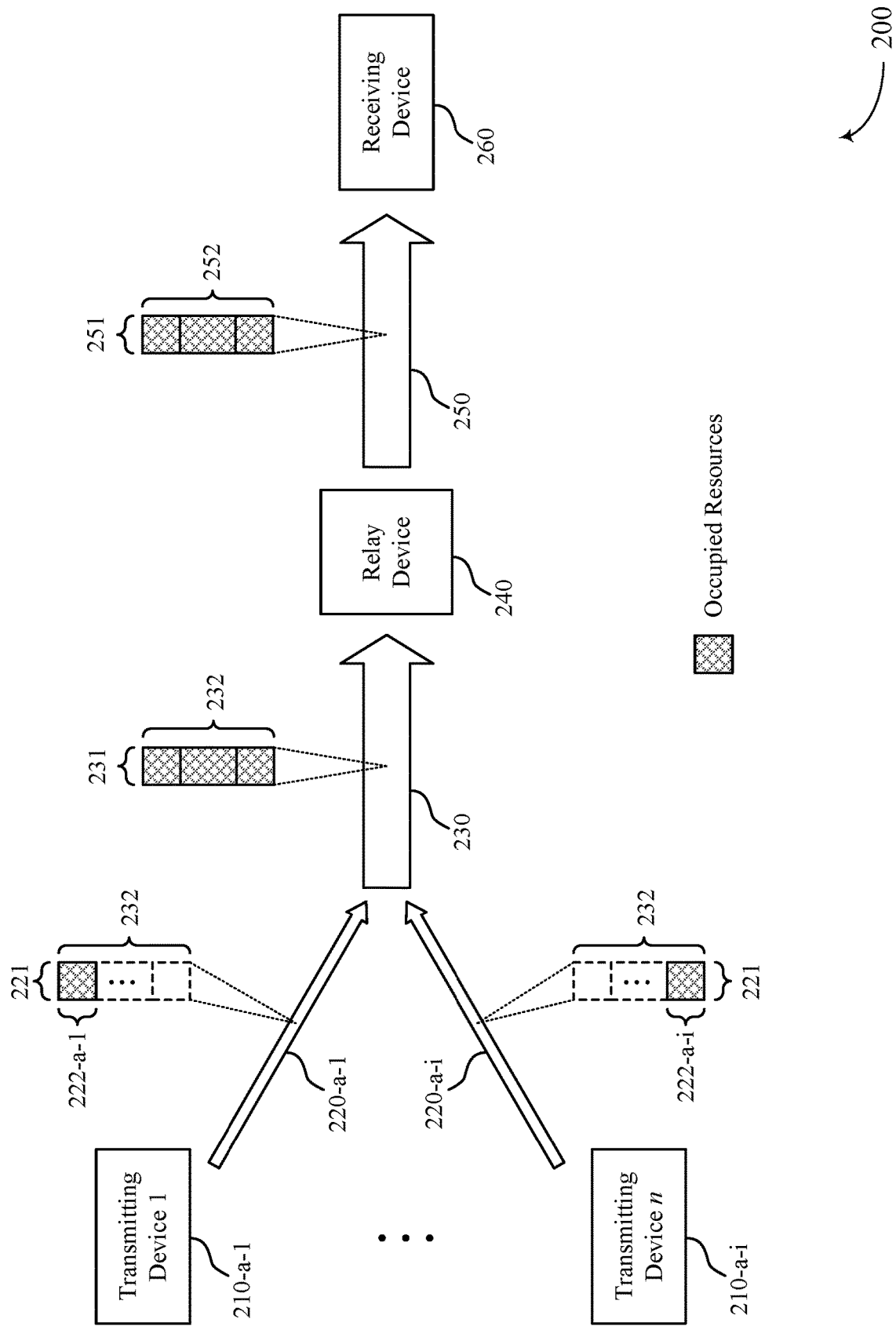
FIG. 2 illustrates an example of a wireless communications system that supports PAPR management for relayed communications in accordance with aspects of the present disclosure.

FIG. 2 illustrates an example of a wireless communications system 200 that supports PAPR management for relayed communications in accordance with aspects of the present disclosure. The wireless communications system 200 includes a relay device 240 that may be configured to forward communications from one or more transmitting devices 210 to a receiving device 260. Although a single relay device 240 is shown, a wireless communication system may include any quantity of one or more relay devices 240 between transmitting devices 210 and a receiving device 260. In some examples, the receiving device 260 may be another relay device.

The wireless communications system 200 may support different types or configurations of the identified devices. For example, transmitting devices 210 may include any device operable to perform transmissions to the relay device 240, including communications to be forwarded to the receiving device 260 (e.g., via the relay device 240). Thus, the transmitting devices 210 may include one or more UEs 115, one or more base stations 105, one or more satellites 160, or various combinations thereof, that may be configured to transmit communications to the relay device 240. The relay device 240 may include any device operable to receive transmissions from a transmitting devices 210 and perform transmissions to the receiving device 260 (e.g., operable to forward received communications or signals to the receiving device 260, directly or indirectly through another relay device 240). Thus, a relay device 240 may be a UE 115 (e.g., in a relay configuration, in a sidelink configuration, in a D2D configuration), a base station 105 (e.g., in a relay configuration, a repeater or donor node in an IAB configuration), or a satellite 160 (e.g., of an NTN, in a transparent payload configuration, in a regenerative payload configuration). The receiving device 260 may include any device operable to receive communications from the relay device 240, and may be referred to as a target device for communications from the transmitting devices 210. Thus, a receiving device 260 may be a UE 115, a base station 105, a gateway node, a sink, or another type of network node (e.g., a node of a core network 130, a scheduling entity).

The transmitting devices 210 may be configured to transmit respective signals 220, which may include data signals, control signals, or reference signals, among other types of signals or combinations of signals (e.g., one or more uplink communication signals, uplink communications or signaling). Each signal 220 may occupy a respective bandwidth 222 (e.g., a frequency resource, a configured BWP, a sub-band, a physical resource block (PRB)) over a time interval 221. In some examples, each of a quantity of transmitting devices 210 (e.g., transmitting devices 210-*a*-1 through 210-*a*-*i*) may be configured to occupy different frequency resources of a bandwidth 232, which may correspond to a channel bandwidth or a receive bandwidth of the relay device 240. The signals 220 may combine (e.g., according to constructive or destructive interference) over a transmission or propagation medium to form a signal 230, which may be received by the relay device 240. The signal 230 may occupy the bandwidth 232 (e.g., a channel bandwidth, a bandwidth W), or a portion thereof, over a time interval 231 (e.g., a TTI, a slot n), which may be associated with the time interval 221 (e.g., a same slot), which may include being shifted in time in accordance with a signal propagation delay. In various examples, the signal 230 may be referred to as a single-user or multi-user signal on an uplink, and may be associated with a PC5 interface (e.g., of a sidelink). The relay device 240 may be configured to forward the received signal 230, or a payload thereof, to the receiving device 260, which may be included in the transmission of a signal 250 (e.g., over a feeder link or inter-satellite link of an NTN, over an IAB link, over a Uu interface with a base station). The signal 250 may be transmitted over a time interval 251 (e.g., a TTI, a slot n' that may or may not be the same as slot n), which may shifted in time relative to the time interval 251 in accordance with a processing delay of the relay device 240. The signal 250 may be transmitted over a bandwidth 252 (e.g., a channel bandwidth, a bandwidth W'), which may correspond to a transmit bandwidth of the relay device 240, where the bandwidth 252 may be the same as the bandwidth 232 or different than the bandwidth 232.

In some examples, to reduce or otherwise manage PAPR of a signal 220 (e.g., per transmitting device 210, on an uplink transmission of a service link), a transmitting device 210 may transmit a signal 220 (e.g., an uplink transmission, an uplink channel, a PUSCH, a PUCCH) within a narrow band, such as single tone, a sub-PRB, or a small quantity of consecutive PRBs, among other techniques for managing or reducing PAPR of signals 220 (e.g., on a per-transmitter level). However, despite supporting relatively low PAPR of the signals 220 themselves, certain constructive or destructive interference of signals 220 may result in relatively high PAPR for the signal 230 (e.g., a composite signal, an aggregate signal, a combination of signals 220). Thus, to support transmission efficiency, receiver sensitivity, or other performance considerations of the relay device 240, PAPR for signals at the relay device 240 (e.g., signals 230, signals 250) may be managed by considering an aggregate effect of signals 220 from transmitting devices 210.

In accordance with examples as disclosed herein, one or more devices of the wireless communications system 200 may be configured to transmit or otherwise inject PAPR reduction signals, which may be referred to as PAPR reduction tones (PRTs). In some examples, one or more transmitting devices 210 may be configured to transmit a PRT, for reception by a relay device 240, which may or may not be included with or added to communication signaling from the same transmitting device 210. Additionally, or alternatively, the relay device 240 may be configured to multiplex a PRT with a signal 230, or otherwise include a PRT in the transmission of a signal 250. In some examples, such techniques may involve capability signaling to inform devices of the wireless communications system 200 of an ability to support PRT transmissions. According to these and other techniques for PAPR reduction, relayed communications of the wireless communication system may be configured with a lower peak power, or otherwise improved signaling, which may improve various aspects of the operation of the wireless communication system.

Figure 3:
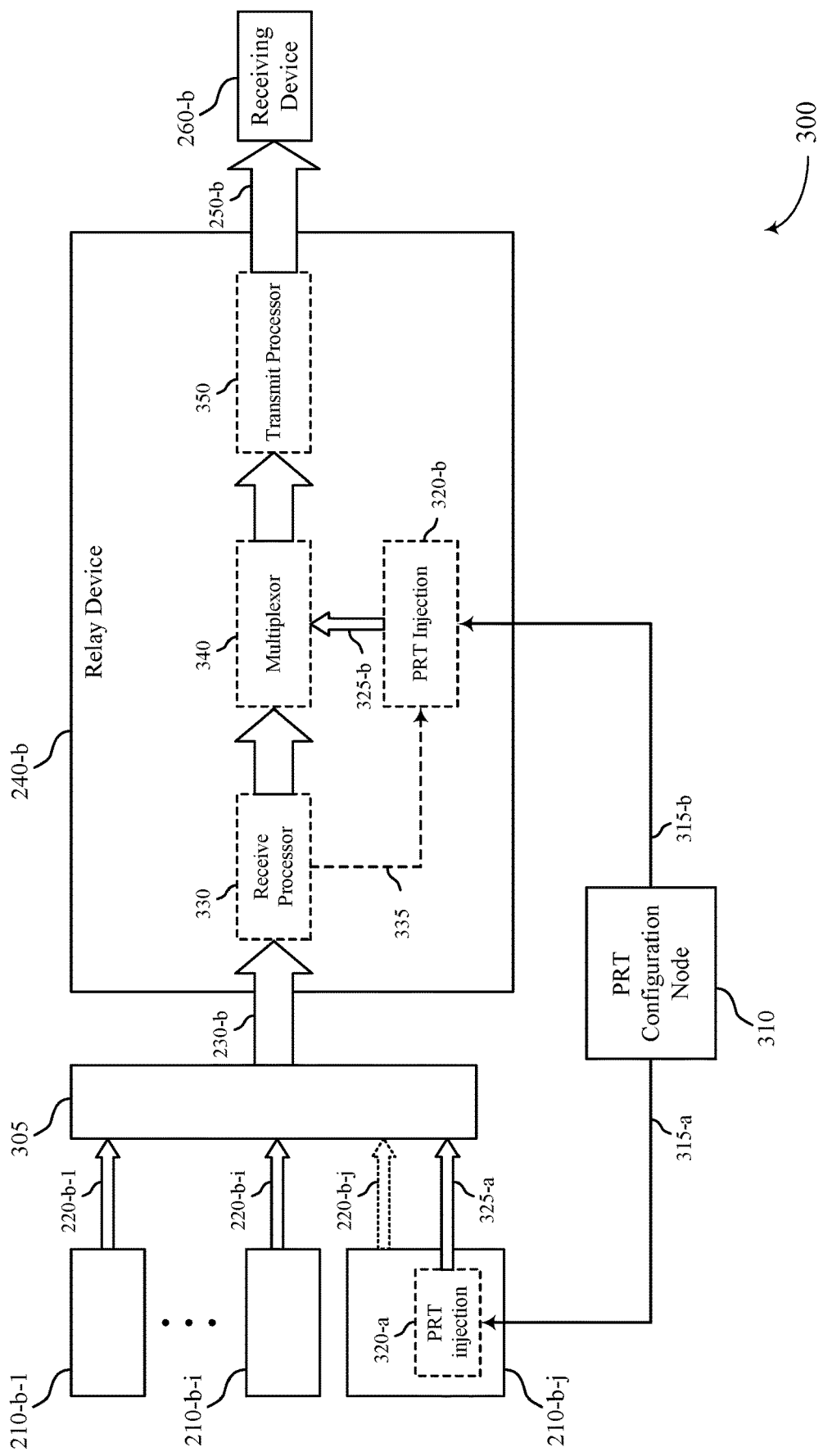
FIG. 3 illustrates an example of a wireless communications system that supports PAPR management for relayed communications in accordance with aspects of the present disclosure.

FIG. 3 illustrates an example of a wireless communications system 300 that supports PAPR management for relayed communications in accordance with aspects of the present disclosure. The wireless communications system 300 includes a relay device 240-b (e.g., a satellite relay, a sidelink relay, an IAB relay) that may be configured to forward communications from one or more transmitting devices 210-b to a receiving device 260-b. The transmitting devices 210-b may be configured to transmit respective signals 220-b, which may include reference signals, control signals, or data signals, among other signals (e.g., tones) or combinations of signals. The signals 220-b may each be a portion of or otherwise transmitted over a channel 305 (e.g., a frequency channel, a wideband channel, a frequency band). The relay device 240-b may be operable to receive a signal 230-b over the channel 305, which may include at least the signals 220-b (e.g., signals 220-b from two or more transmitting devices 210-b scheduled for simultaneous or otherwise concurrent transmission) that have combined over a signal propagation medium (e.g., over a time interval).

The relay device 240-b may be configured to forward the signal 230-b, or a payload thereof, to the receiving device 260-b, which may involve various processing operations at the relay device. In some examples, the relay device 240-b may include a receive processor 330, which may include circuitry or controllers operable to perform signal equalization, tone clipping (e.g., of noisy tones), averaging, filtering, or other operations or combinations of operations. In some examples, the relay device 240-b may include a transmit processor (e.g., to generate the signal 250-b for transmission), which may include circuitry or controllers operable to perform filtering, amplification, or other operations or combinations of operations. In some examples, the relay device 240-b may be an example of a smart relay (e.g., a smart satellite, a relay having on-board intelligence or other communications processing capability), which may support additional processing operations, to support the transmission of signal 250-b, such as decoding or coding, demodulation or modulation, among other operations. In some examples, the relay device 240-b may not perform certain processing operations (e.g., omitting demodulation, decoding, or other processing that may be associated with translations or transformations in the digital or analog domain), and may be referred to as a non-processing relay, a bent-pipe relay, or a non-translating relay (e.g., where a transmitted signal or waveform of a transmitted signal is substantially the same as received signal or waveform of a received signal).

In some examples, aspects of the transmit processor 350, of the receive processor 330, or both, may benefit from having relatively low or otherwise managed PAPR (e.g., of the signal 250-b, of the signal 230-b). For example, regarding the transmit processor 350, a relatively low PAPR of the signal 250-b may be associated with relatively low peak power of the signal 250-b, relatively efficient transmission of the signal 250-b, a relatively lower power consumption or power rating of the transmit processor 350 or a transmitter for transmitting the signal 250-b, among other benefits. Regarding the receive processor 330, a relatively low PAPR of the signal 230-b may be associated with relatively improved reception sensitivity, relatively lower likelihood of clipping or other adverse attenuation, among other benefits.

To support various aspects of PAPR reduction or management (e.g., of the signal 230-b, of the signal 250-b, or both), the wireless communications system 300 may include a PRT configuration node 310, which may manage various aspects of a PAPR reduction configuration (e.g., a configuration for PAPR reduction signals, a configuration for generating PRTs). The PRT configuration node 310 may be any node of the wireless communications system 300 (e.g., a network node) that is operable to evaluate, configure, schedule, or otherwise manage a PAPR reduction configuration. In some examples, the PRT configuration node 310 may be a scheduling entity, such as an entity that schedules signals 220-b or 250-b, an entity that provides uplink grants for signals 220-b or 250-b, an entity that configures aspects of communication links for the transmitting devices 210-b, the relay device 240-b, or the receiving device 260, or an entity that performs other configuration operations. In various examples, the PRT configuration node 310, or a portion thereof, may or may not be included in or otherwise associated with (e.g., connected with, part of the same core network 130 as) the receiving device 260-b. In various examples, the PRT configuration node 310, or a portion thereof, may or may not be included in or otherwise associated with (e.g., connected with) the relay device 240-b.

The PAPR reduction configuration managed by the PRT configuration node 310 may support PAPR reduction via one or more transmitting devices 210-b (e.g., according to transmitter-side processing, according to UE-side processing), via the relay device 240-b (e.g., according to relay-side processing), or a combination thereof. For example, the PRT configuration node 310 may transmit a PAPR configuration indication 315-a to one or more transmitting devices 210-b (e.g., transmitting device 210-b-j) to support a PRT injection 320-a at the one or more transmitting devices 210-b (e.g., a PRT injection by the transmitting device 210-b-j, a PRT injection by one or more assisting UEs). A PRT injection 320-a may be associated with the generation and transmission of a signal 325-a (e.g., a PAPR reduction signal, a PRT transmission), which may combine with signals 220-b over a signal propagation medium (e.g., a combination in signal propagation domain, a combination in an electromagnetic domain, a combination by way of constructive or destructive interference) to reduce the PAPR of the signal 230-b, which may, in turn, reduce the PAPR of the signal 250-b. In various examples, transmission of a signal 325-a may or may not be accompanied by a concurrent transmission of a signal 220-b (e.g., signal 220-b-j transmitted by transmitting device 210-b-j, uplink communications, a communication signal, a reference signal, data signal, control signal, or combination thereof). In some examples, the PAPR configuration indication 315-a may be or include a command to perform a PAPR reduction transmission (e.g., to the relay device 240-b), such as a grant of resources (e.g., an uplink grant), a signal configuration or definition, or other explicit or implicit command. Such a command may be based at least in part on an evaluation (e.g., by the PRT configuration node 310, by the relay device 240-b) of PAPR for communications from the transmitting devices 210-b, such as a measured, calculated, inferred, or predicted PAPR of the signal 230-b or PAPR of the signal 250-b, or combination thereof.

Additionally, or alternatively, the PRT configuration node 310 may transmit a PAPR configuration indication 315-b to the relay device 240-b to support a PRT injection 320-b at the relay device (e.g., a PRT injection by the relay device 240-b). A PRT injection 320-b may be associated with the generation and transmission of a signal 325-*b*. In some examples, the signal 325 may be combined with the signal 230-*b*, or payload thereof (e.g., after processing by a receive processor 330), by the multiplexor 340 (e.g., a combination in signal processing hardware, a combination in an analog or digital processing domain). In some examples, the PAPR configuration indication 315-*b* may be or include a command to multiplex a signal 325-*b* with communications from the transmitting devices 210-*b*, such as a grant of resources (e.g., an uplink grant), a signal configuration or definition, or other explicit or implicit command. Such a command may be based at least in part on an evaluation (e.g., by the PRT configuration node 310, by the relay device 240-*b*) of PAPR for communications from the transmitting devices 210-*b* (e.g., a measured, calculated, inferred, or predicted PAPR of the signal 230-*b* or PAPR of the signal 250-*b*, or combination thereof). In some examples, the PAPR configuration indication 315-*b* may indicate an allocation of resources (e.g., in the frequency domain, in the time domain) for the PRT injection 320-*b* or the signal 325-*b*, and the relay device 240-*b* may determine the specific configuration for the signal 325-*b*. For example, the receive processor 330 may perform an evaluation of PAPR for the received signal 230-*b* to generate a PAPR metric 335, and the signal 325-*b* may be determined based at least in part on the generated PAPR metric 335. A PAPR metric 335 may include a PAPR value, a power spectral density (PSD), or various other information related to PAPR of the signal 230-*b* or a PAPR reduction relative to the signal 230-*b*, such as tones or signals that are causing a relatively high PAPR, or candidate tones or signals that may be used to reduce a PAPR.

In some examples, the PRT configuration node 310 may support a determination of a PRT to be included in relayed communications, which may include a group-specific PRT, or a cell-specific PRT, among other configurations of a PRT. Such a determination may be performed by the PRT configuration node 310 itself, or may be performed at the relay device 240-*b* with the support of configuration by the PRT configuration node 310. In some examples, a determination of a PRT may be based at least in part on a bandwidth allocated to co-scheduled transmitting devices 210-*b*, which may be associated with a bandwidth 222 or a bandwidth 232. In some examples, a determination of a PRT may be based at least in part on a bandwidth of a receiver at the relay device 240, which may be associated with a bandwidth 232. In some examples, a determination of a PRT may be based at least in part on a numerology, a waveform, a requirement related to adjacent channel leakage ratio (ACLR), a target PAPR or target for PAPR reduction, among other factors.

Figure 4:
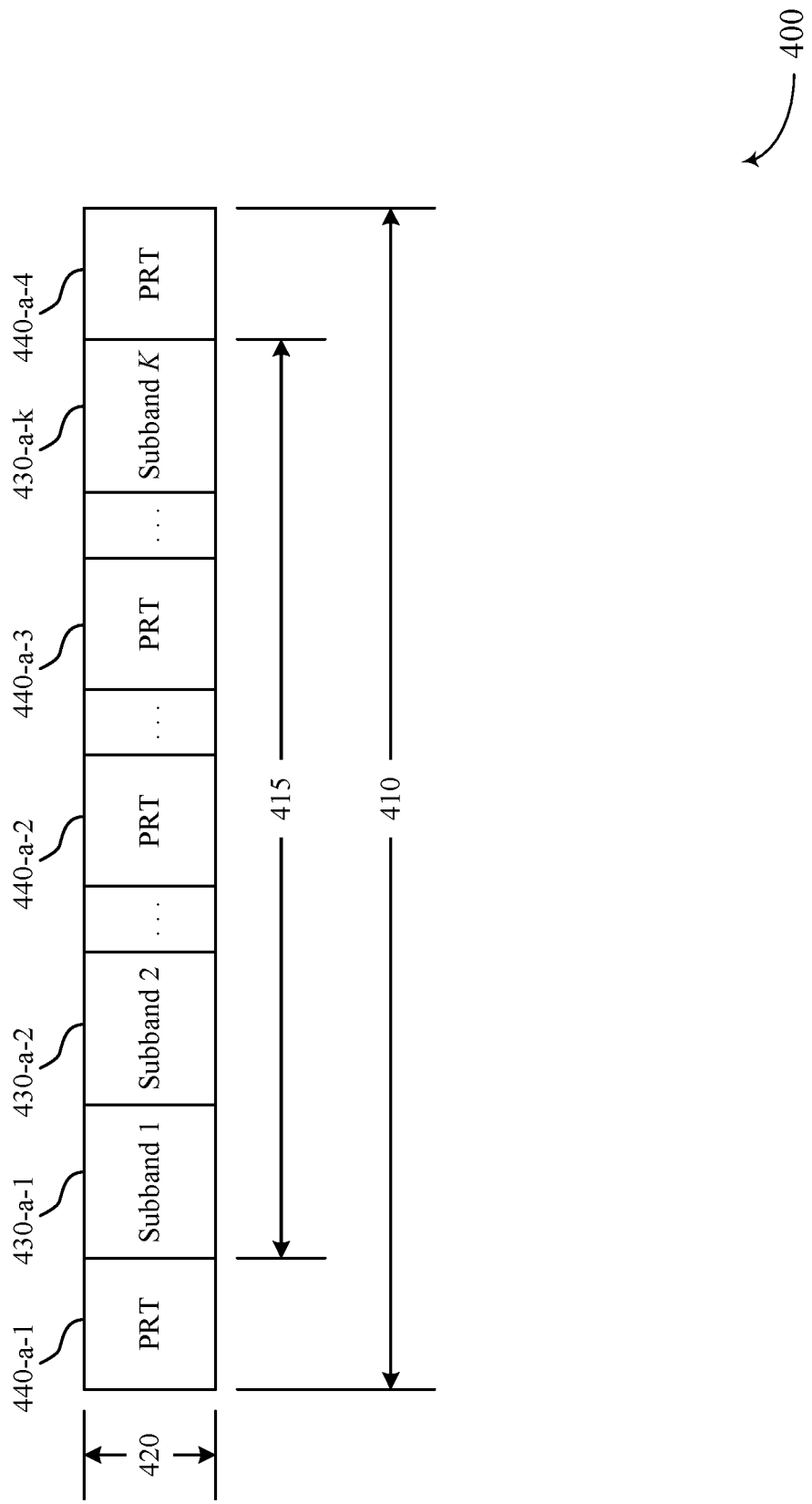
FIG. 4 illustrates an example of a resource allocation that supports PAPR management for relayed communications in accordance with aspects of the present disclosure.

FIG. 4 illustrates an example of a resource allocation 400 that supports PAPR management for relayed communications in accordance with aspects of the present disclosure. The resource allocation 400 may be associated with a bandwidth 410 and a time interval 420, and may illustrate an example of resources that may be allocated for various signals in a wireless communication system. In some examples, the bandwidth 410 may correspond to frequency resources allocated to a relay device 240, such as frequency resources allocated for signals 230, for signals 250, or both (e.g., resources allocated for forwarding multiplexed signals to a receiving device 260 or another relay device 240).

The resource allocation 400 includes subband resources 430-*a* (e.g., subbands), which may each span a respective portion of the bandwidth 410 in the frequency domain. The subband resources 430-*a* may be allocated to transmitting devices 210 for such purposes as transmitting signals 220, and may refer to a single carrier, a set of consecutive subcarriers, a sub-PRB, or a quantity of consecutive PRBs. The example of resource allocation 400 illustrates a division into K subbands which, in some examples, may be allocated to N transmitting devices 210 (e.g., N UEs 115), where N≤K. In some examples, a summation or span of subband resources 430 may be an example of a bandwidth 415, which may correspond to frequency resources allocated to the N transmitting devices 210.

The resource allocation 400 also includes PRT resources 440-*a*, which may each span a respective portion of the bandwidth 410 in the frequency domain. The PRT resources 440-*a* may be allocated for PRT injection, such as PRT injection by a transmitting device 210 (e.g., for injection by one or multiple assisting UEs 115 or other transmitting devices 210, for a signal 325-*a*), PRT injection by a relay device 240 (e.g., for a signal 325-*b*), or both. In some examples, PRT resources 440 (e.g., PRT resources 440-*a*-1 and 440-*a*-4) may be allocated to one or both ends of a bandwidth 410, which may be included in or be adjacent to a guard band. Additionally, or alternatively, PRT resources 440 (e.g., PRT resources 440-*a*-2 and 440-*a*-3) may be allocated to within a middle range of a bandwidth 410, such as between subband resources 430. In some examples, one or more PRTs may be injected by transmitting devices 210, and a relay device 240 may remove or cancel the PRTs of the transmitting devices 210 (e.g., at a receive processor 330). In some examples, a relay device 240 may subsequently inject a PRT, which may include a PRT injection using the same or different PRT resources 440 as were used by one or more transmitting devices 210.

Figure 5:
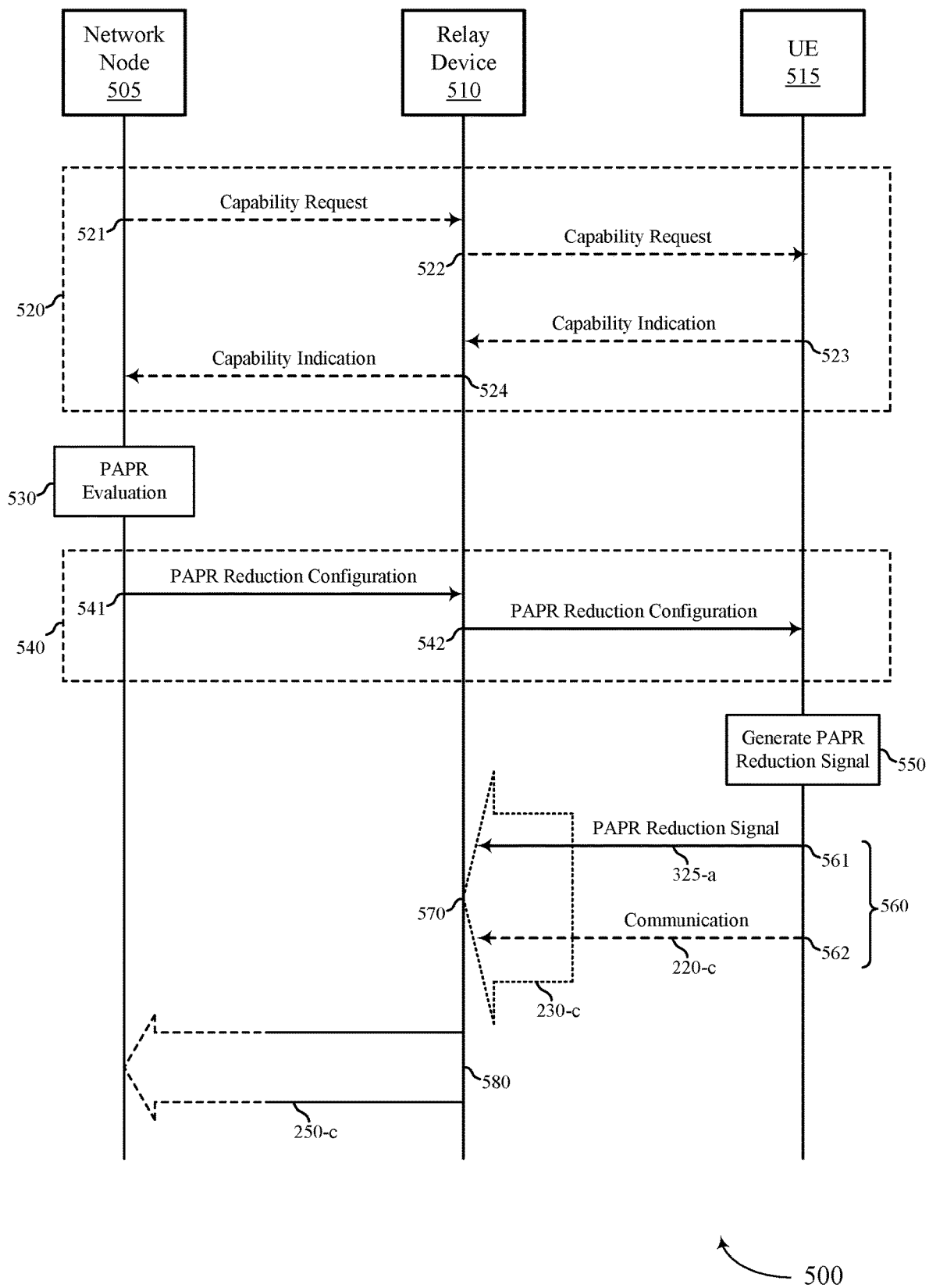
FIG. 5 illustrates an example of a process flow that supports PAPR management for relayed communications in accordance with aspects of the present disclosure.

FIG. 5 illustrates an example of a process flow 500 that supports PAPR management for relayed communications in accordance with aspects of the present disclosure. The process flow 500 may illustrate an example for supporting PRT transmission by a one or more transmitting devices 210, such as one or more UEs 115 (e.g., UE 515, a first device). Although described with reference to a UE 515, the described techniques may be supported by any type of transmitting device 210 in accordance with examples as disclosed herein. The process flow 500 may also include a relay device 510 (e.g., a second device), which may be an example of a relay device 240, and a network node 505 (e.g., a third device), which may be an example of a PRT configuration node 310.

In some examples, at 520, the process flow 500 may include various techniques for signaling capability information associated with support of PAPR reduction. For example, at 521, the network node 505 may transmit a capability request (e.g., as an inquiry of the capability of the UE 515 for PRT transmission), which may be received by the relay device 510, and, at 522, the relay device 510 may forward the capability request by transmitting the capability request to the UE 515. In response, at 523, the UE 515 may transmit a capability indication (e.g., signaling whether or not the UE 515 supports PRT transmission), which may be received by the relay device 510, and, at 524, the relay device may forward the capability indication by transmitting the capability indication to the network node. In some examples, the relay device 510 may be omitted from the capability signaling of 520 (e.g., according to direct signaling between the network node 505 and the UE 515), or the capability signaling may be routed or relayed through another device (not shown). In some examples, a capability request may be omitted, such that the UE 515 transmits a capability indication proactively (e.g., during a connection establishment, transmitting a capability indication at 523 without receiving an explicit or implicit capability request). In some examples, the capability signaling operations of 520 may be omitted altogether.

In some examples (e.g., if the UE 515 indicates a capability to support PRT transmission via the signaling of 523 and 524, if the network node 505 assumes that the UE 515 supports PRT transmission without capability signaling), the network node 505, the relay device 510, or both may consider the UE 515 to be an assisting UE for the purposes of PAPR reduction. One or more PRT transmissions by the UE 515 or one or more other transmitting devices 210 may be triggered (e.g., by the network node 505, using a grant issued by the network node 505), which may include a trigger transmitted by the network node 505 via the relay device 510. If multiple transmitting devices 210 (e.g., including the UE 515) are triggered at the same time, the network node 505 may send separate triggers, and each transmitting device 210 may transmit a subset of PRTs (e.g., in a configured or active BWP, in accordance with a PRT grant).

To support an initiation of PRT transmission, at 530, the network node 505 may perform a PAPR evaluation. In some examples, the PAPR evaluation of 530 may include a determination of a PAPR for communications from transmitting devices (e.g., transmitting devices 210), which may or may not include the UE 515. In some examples, the PAPR evaluation of 530 may include a determination of a PAPR for signals via the relay device 510, such as a signal 230 or a signal 250 (e.g., a composite signal that includes communications from a set of transmitting devices 210). In various examples, the PAPR evaluation of 530 may include various measurements, calculations, inferences, or predictions of PAPR for the respective communications or signals.

The operations of 530 may include a determination of a PAPR reduction scheme or configuration based on an evaluated PAPR, which may be based on a bandwidth of communications (e.g., a bandwidth 415), a transmission bandwidth (e.g., of the relay device 510, a bandwidth 410), a PAPR or PAPR reduction target, or a combination thereof. Additionally, or alternatively, a configuration for PAPR reduction signals may be based at least in part on a numerology, a waveform, an adjacent channel leakage ratio, a guard band configuration, a UE capability indication, a UE power class, a bandwidth of an active bandwidth part, a number of transmit antennas, or a combination thereof. In various examples, the network node 505 may determine a group-specific PRT configuration, a cell-specific PRT configuration, or both. One or more assisting transmitting devices 210 may be chosen (e.g., as part of the PAPR evaluation of 530) from N transmitting devices 210 scheduled for communications (e.g., reference signal, data, or control transmission), or may be separately configured (e.g., as a dedicated transmitting device 210 not also scheduled for communications). In some examples, the PAPR evaluation 530 may include or be performed in parallel with an allocation of reference signal, data, or control tones to N transmitting devices 210, which may include an allocation by a dynamic grant or a configured grant. In some examples, such an allocation may include an allocation of subband resources 430, such that each transmitting device 210 may perform transmissions (e.g., of signals 220) on one or multiple sub-bands within a configured or active BWP (e.g., of the transmitting device 210).

At 540, the network node 505 may indicate a PAPR reduction configuration to the UE 515. For example, at 541, the network node 505 may transmit an indication of a PAPR reduction configuration (e.g., as a command, as a grant, as an uplink grant, as a PRT grant, as an indication of PRT resource 440), which may be received by the relay device 510, and, at 542, the relay device 510 may forward the indication of the PAPR reduction configuration by transmitting the indication to the UE 515.

In some examples, a grant or other indication of the PAPR reduction configuration communicated at 540 may indicate an allocation of resources in the frequency domain. For example, a grant may include a bit map indicating one or more REs, one or more REGs, or one or more physical PRB groups (PRGs), where a value of "1" may indicate that a PRT is transmitted or activated, and a value of "0" may indicate that a PRT is muted or deactivated. In some examples, a grant may include an index of starting RE, REG, or PRG for PRT transmission (e.g., a value "$S_f$"), and a length of PRT transmission across a consecutive quantity of REs, REGs, or PRGs (e.g., a value "$L_f$"). In some examples, a grant may include an index of a lookup table or other lookup resource, which may provide an indication or definition of a starting value and a length (e.g., values $S_f$ and $L_f$).

In some examples, a grant or other indication of the PAPR reduction configuration may indicate an allocation of resources in the time domain. For example, a grant may include a bit map of symbol, a mini-slot, or a slot, or some other TTI, where a value of "1" may indicate that a PRT is transmitted or activated, and a value of "0" may indicate that a PRT is muted or deactivated. In some examples, a grant may include an index of starting symbol, mini-slot, slot, or other TTI for PRT transmission (e.g., a value "$S_t$"), and a length of PRT transmission spanning a consecutive number of symbols, mini-slots, slots or other TTIs (e.g., a value "$L_t$"). In some examples, a grant may include an index of a lookup table or other lookup resource, which may provide an indication or definition of a starting value and a length (e.g., values $S_t$ and $L_t$).

In some examples, a grant or other indication of the PAPR reduction configuration may indicate an allocation of resources in the power domain (e.g., an allocation or identification of a power for PRT transmission, as determined or configured by the network node 505), which may be associated with a PRT pattern specified in time domain, frequency domain, or both. In some examples, a grant or other indication of the PAPR reduction configuration may indicate a transmission configuration indication (TCI) state of PRT transmission for the UE 515, a priority of PRT transmission, or both, among other information. These and other configurations of grants for PRT transmission may include or be otherwise based on a cell-specific or group-specific PRT pattern in frequency, time, space (e.g., in a spatial domain), or power, or combination thereof (e.g., as determined by the network node 505), which may include different grants for different transmitting devices 210 (e.g., different UEs 115).

In various examples, a PRT grant may be transmitted separately from other scheduling information (e.g., a second grant), such as scheduling information for reference signals, control signals, data signals, or other signals (e.g., an uplink grant associated with a signal 220 from the UE 515), or a PRT grant may be multiplexed with other such scheduling information. For example, a single downlink control information (DCI) message may include a first grant for a data, control, or reference signal (e.g., via a PUSCH, PUCCH, or SRS), and a second grant for a PRT. For a separate or independent transmission of a PRT grant (e.g., when the UE 515 is not also being scheduled for uplink communications), a cyclic redundancy check (CRC) may be generated for or appended to the PRT grant. For a PRT grant that is multiplexed with other scheduling information, a CRC may be generated for a combination of the PRT grant and other scheduling information (e.g., scheduling information for uplink communications from the UE 515), and appended to the combination of the PRT grant and the other scheduling information.

At 550, the UE 515 may generate a PAPR reduction signal (e.g., a set of one or more PRTs, a signal 325-*a*) based at least in part on the indication of the PAPR reduction configuration of 540. The generation at 550 may include generating a PRT in accordance with a resource allocation (e.g., in the time domain, in the frequency domain, in the spatial domain), a power configuration, a tone or symbol configuration, or other configuration in the indicated PAPR reduction configuration.

At 560, the UE 515 may perform a transmission, which may include transmitting (e.g., at 561) the PAPR reduction signal generated at 550 (e.g., transmitting a signal 325-*a*). In some examples, the UE 515 may transmit the PAPR reduction signal only (e.g., without frequency- or time-domain multiplexed reference signals, control signals, or data signals), which may include a transmission over a symbol, mini-slot, or slot, or duration thereof. In various examples, the UE 515 may or may not also transmit a communications signal (e.g., at 562, transmitting a signal 220-*c*, transmitting communications concurrently with transmitting the PAPR reduction signal). For example, in response to a PRT grant and other scheduling information (e.g., a second grant, as received by the UE 515), the UE 515 may, on a same symbol or during the same symbol duration, transmit a PRT and a reference signal, a control signal, or a data signal on different subcarriers (e.g., according to frequency-domain multiplexing). In some examples, the UE 515 may transmit a PRT and communications using different power levels (e.g., regardless of whether a PRT is multiplexed with communications). In some examples, the UE 515 may rate match its signal around the PAPR reduction signal, which may include a group-specific PRT, a cell-specific PRT, or a combination thereof.

At 570, the relay device 510 may receive a signal (e.g., a signal 230-*c*) including communications to be forwarded by the relay device 510 (e.g., to the network node 505, or to another receiving device different than the network node 505). The signal may include the PAPR reduction signal transmitted by the UE 515 at 561, as well as communication signaling transmitted by the UE 515 at 562 (e.g., where present). In some examples, the signal received at 570 may include additional PAPR reduction signals, or communication signaling, or both, as transmitted by one or more other transmitting devices 210 and combined over a signal propagation medium.

At 580, the relay device 510 may transmit signaling (e.g., a signal 250-*c*) including at least the communications to be forwarded by the relay device 510 and any PAPR reduction signals. In various examples, the signaling transmitted at 580 may be received by the network node 505, or some other receiving device 260. In some examples, receiving the signal 250-*c* may be associated with demultiplexing communications signaling associated with the relayed communications, and processing the communications signaling independent of PAPR reduction signals to obtain data streams, control information, reference signals, or a combination thereof from a set of transmitting devices 210.

By including at least the PAPR reduction signal transmitted at 561, and any other PAPR reduction signals transmitted by other transmitting devices, communications relayed by the relay device 510 (e.g., signal 230-*c*, signal 250-*c*, an aggregate signal carrying signaling from a set of one or more transmitting devices 210) may be associated with a lower PAPR than if the PAPR reduction signal was not included. The lower PAPR associated with such a transmission may support a lower peak power or power consumption by the relay device 510, a lower transmission power or lower transmission power rating of the relay device 510, improved receiver sensitivity (e.g., of the relay device 510, of the network node 505), among other benefits.

Figure 6:
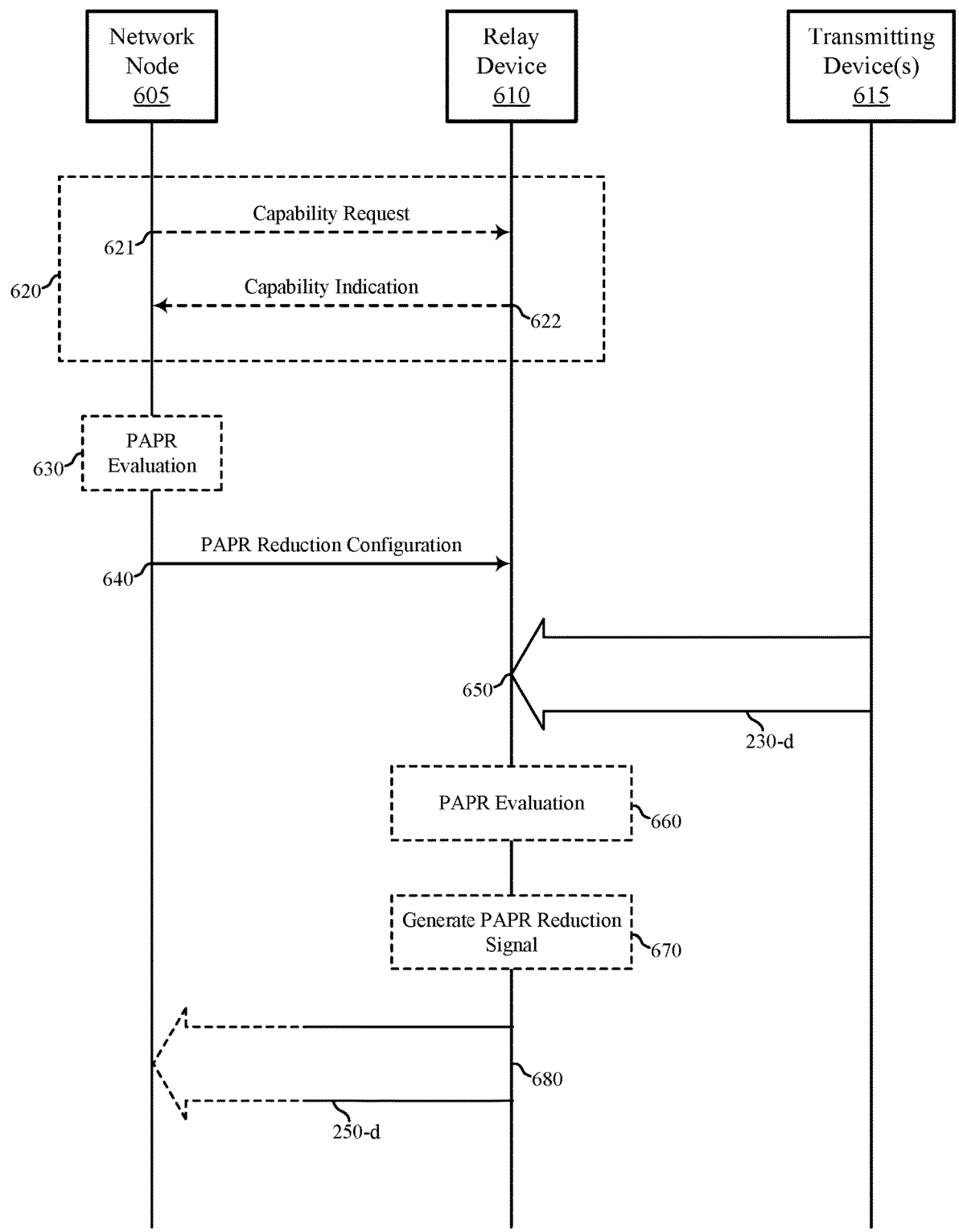
FIG. 6 illustrates an example of a process flow that supports PAPR management for relayed communications in accordance with aspects of the present disclosure.

FIG. 6 illustrates an example of a process flow 600 that supports PAPR management for relayed communications in accordance with aspects of the present disclosure. The process flow 600 may illustrate an example for supporting PRT transmission (e.g., PRT injection) by a relay device 610, which may be an example of a relay device 240 (e.g., a first device). The process flow 600 may also include a network node 605 (e.g., a second device), which may be an example of a PRT configuration node 310, and one or more transmitting devices 615 (e.g., one or more third devices), which may be examples of transmitting devices 210. In some examples, one or more aspects of the process flow 600 may be performed in tandem or parallel with one or more aspects of the process flow 500 (e.g., for a joint PRT transmission by one or more transmitting devices 210 and a relay device 240).

In some examples, at 620, the process flow 600 may include various techniques for signaling capability information associated with support of PAPR reduction. For example, at 621, the network node 605 may transmit a capability request (e.g., as an inquiry of the capability of the relay device 610 for PRT injection), which may be received by the relay device 610. In response, at 622, the relay device 610 may transmit a capability indication (e.g., signaling whether or not the relay device 610 supports PRT injection), which may be received by the network node 605. In some examples, a capability request may be omitted, such that the relay device 610 transmits a capability indication proactively (e.g., during a connection establishment, transmitting a capability indication at 622 without receiving an explicit or implicit capability request). In some examples, the capability signaling operations of 620 may be omitted altogether.

In some examples (e.g., if the relay device 610 indicates a capability to support PRT injection via the signaling of 622, if the network node 605 assumes that the relay device 610 supports PRT injection without capability signaling), the network node 605 may consider the relay device 610 to be an assisting relay for the purposes of PAPR reduction. In some examples, one or more aspects of a PRT injection scheme may be determined by the network node 605 for the relay device 610 alone, or the network node 605 may determine one or more aspects of a PRT injection scheme jointly for the relay device 610 and one or more transmitting devices 210 (e.g., transmitting devices 615, assisting UEs). Some examples may include a joint PRT transmission by the relay device 610 (e.g., a PRT injection) and a subset of assisting transmitting devices (e.g., in accordance with one or more aspects of the process flow 500). Other examples may include PRT transmission by the relay device 610 only, or PRT transmission by transmitting devices 210 only. In some examples, one or more PRT transmissions (e.g., injections) by the relay device 610 may be triggered (e.g., by the network node 605, using a grant issued by the network node 605).

In some examples, to support an initiation of PRT transmission, at 630, the network node 605 may perform a PAPR evaluation. A PAPR evaluation of 630 may include a determination of a PAPR for communications from the transmitting device(s) 615. In some examples, the PAPR evaluation of 630 may include a determination of a PAPR for signals via the relay device 610, such as a signal 230 or a signal 250 (e.g., a composite signal that includes communications from a set of transmitting devices 210). A PAPR evaluation of 630 may include various measurements, calculations, inferences, or predictions of PAPR for the respective communications or signals, including aspects similar to those described with reference to the operations of 530 of process flow 500. In some examples, the PAPR evaluation of 630 may be omitted, and the process flow 600 may involve a PAPR evaluation at the relay device 610 (e.g., at 660).

At 640, the network node 605 may indicate a PAPR reduction configuration to the relay device 610. For example, the network node 605 may transmit an indication of a PAPR reduction configuration (e.g., as a command, as a grant, as an uplink grant, as a PRT grant, as an indication of PRT resource 440), which may be received by the relay device 610. In some examples, a grant or other indication of the PAPR reduction configuration communicated at 640 (e.g., a PRT grant) may indicate an allocation of resources in the frequency domain, in the time domain, or in the power domain, including aspects similar to those described with reference to the operations of 540 of process flow 500. In some examples, such a PRT grant may be issued as a command or request for the relay device 610 to transmit or inject a PRT, such that a PRT transmission scheme of the relay device 610 may be based only on such PRT grants as configured by the network node 605. In some examples, such a PRT grant may be issued as a flexible or available allocation of resources for the relay device 610 to transmit or inject a PRT as determined at the relay device 610, such that a PRT transmission scheme of the relay device 610 may be based on such PRT grants as configured by the network node 605 as well as various evaluations by the relay device 610, such as evaluations of signals received at the relay device 610 (e.g., signals 230, which may include one or more signals 220).

At 650, the relay device 610 may receive communications from the transmitting device(s) 615 (e.g., in a signal 230-*d*) to be forwarded by the relay device 610. The signal 230-*d* may include one or more signals 220, and may include one or more signals 325-*a* (e.g., as generated and transmitted in accordance with aspects of the process flow 500). For example, reference signal, data, or control tones may be allocated to N transmitting devices 615 (e.g., by dynamic grant, by configured grant, using a subband resource 430), and each transmitting device 615 may transmit a respective signal 220 on one or multiple sub-bands within an active or configured BWP (e.g., for the transmitting device 615). In some examples, the relay device 610 may collect signals on K subbands, where K≥N, and may perform various reception processing. In some examples, receiving the signal 230-*d* may include operations such as equalization, tone clipping, averaging, or filtering, which may be supported by a bent-pipe or regenerative relay device 610 (e.g., a bent pipe satellite 160). In some examples, receiving the signal 230-*d* may include further signal processing such as demodulation or decoding, which may be supported by a smart relay device 610 (e.g., a relay having signal processing capabilities, a smart satellite 160) and may support such downstream operations as PAPR evaluations (e.g., at 660).

At 660, the relay device 610 may perform a PAPR evaluation, such as an evaluation on the communications received at 650 (e.g., an evaluation of the signal 230-*d*). For example, the receive processor 330 may perform an evaluation of PAPR for the received signal 230-*c* to generate a PAPR metric, which may include a PAPR value, a power spectral density (PSD), or various other information related to PAPR of the signal 230-*b* or a PAPR reduction relative to the signal 230-*b*, such as tones or signals that are causing a relatively high PAPR, or candidate tones or signals that may be used to reduce a PAPR. In some examples, the operations of 660 may be omitted, such as when the indication of the PAPR reduction configuration at 640 is an explicit command or request to perform a PRT transmission as configured by the network node 605 or when a PAPR evaluation is performed at 630. In some examples, PAPR evaluations may be performed at both the network node 605 (e.g., at 630) and the relay device (e.g., at 660).

At 670, the relay device 610 may generate a PAPR reduction signal (e.g., a set of one or more PRTs, a signal 325-*b*) based at least in part on the indication of the PAPR reduction configuration of 640. In some examples, the PAPR reduction signal generation at 670 may include generating a PRT in accordance with a resource allocation (e.g., in the time domain, in the frequency domain, in the spatial domain), a power configuration, a tone or symbol configuration, or other configuration in the indicated PAPR reduction configuration. For example, the relay device 610 may inject a set of predetermined PRTs, where a PRT configuration may be group-specific or cell specific. In some examples, generating the PAPR reduction signal generation at 670 may also be based at least in part on a PAPR metric as determined at the relay device 610, such as being based on a PRT grant configured by the network node 605 (e.g., and indicated at 640) and on a PAPR and PSD of the signal 230-*d*. The relay device 610 may multiplex PRTs with the signal 230-*d* (e.g., from the N transmitting devices 615), which may involve multiplexing with a signal that has been modified according to various receive processing operations. The relay device 610 may perform transmit processing, such as amplification and filtering, to support a signal transmission to a receiving device 260 (e.g., at 680).

In some examples that support a joint PRT transmission by the transmitting devices 615 and the relay device 610, one or more PRT transmissions may be performed by one or more of the transmitting devices 615 in accordance with aspects of the process flow 500. The relay device 610 may receive N user signals (e.g., signals 220) transmitted on K sub-bands by the transmitting devices 615, as well as the PRTs transmitted from assisting transmitting devices 615. The relay device 610 may perform reception processing jointly or separately for the N user signals on the K subbands and the PRTs. In some examples, the relay device 610 may remove or cancel PRTs transmitted by the transmitting devices 615 at a reception processing stage, and the relay device 610 may inject PRTs over the same subcarriers as the PRTs from the assisting transmitting devices 615 or over different subcarriers as the PRTs from the assisting transmitting devices 615. The relay device 610 may At 680, the relay device 610 may transmit signaling (e.g., a signal 250-*d*) including at least the communications to be forwarded by the relay device 610 and any PAPR reduction signals (e.g., as injected by the relay device 610, as transmitted by one or more transmitting devices 615). In various examples, the signaling transmitted at 680 may be received by the network node 605, or some other receiving device 260. In some examples, receiving the signal 250-*d* may be associated with demultiplexing communications signaling associated with the relayed communications, and processing the communications signaling independent of PAPR reduction signals to obtain data streams, control information, reference signals, or a combination thereof from a set of transmitting devices 615.

By including at least the PAPR reduction signal injected or transmitted at 680, and any other PAPR reduction signals transmitted by of the transmitting devices 615, communications transmitted by the relay device 610 (e.g., signal 250-d, an aggregate signal carrying signaling from a set of one or more transmitting devices 210) may be associated with a lower PAPR than if the PAPR reduction signal was not included. The lower PAPR associated with such a transmission may support a lower peak power or power consumption by the relay device 610, a lower transmission power or lower transmission power rating of the relay device 610, improved receiver sensitivity (e.g., of the relay device 610, of the network node 605), among other benefits.

Figure 7:
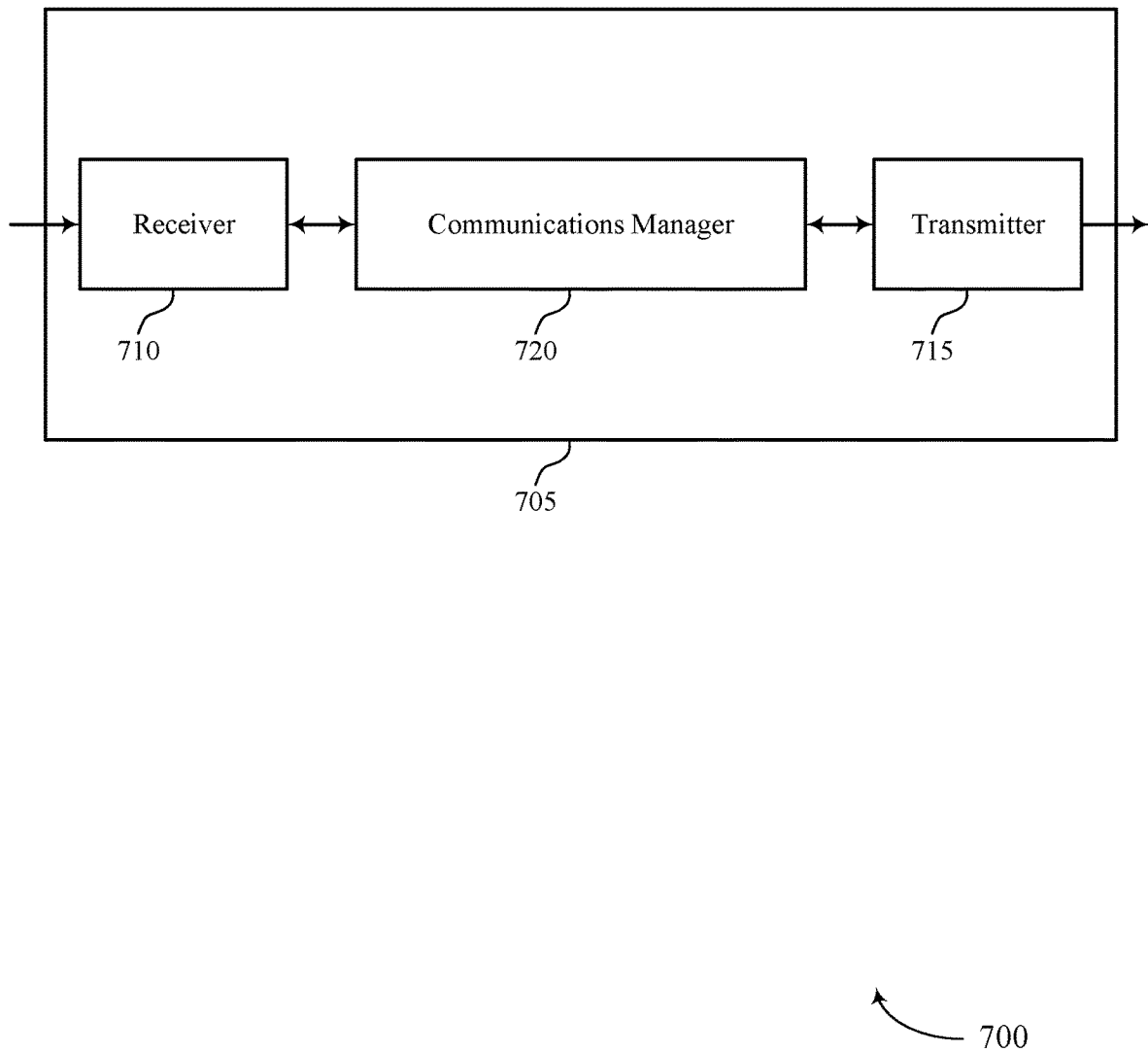
FIGS. 7 and 8 show block diagrams of devices that support PAPR management for relayed communications in accordance with aspects of the present disclosure.

FIG. 7 shows a block diagram 700 of a device 705 that supports PAPR management for relayed communications in accordance with aspects of the present disclosure. The device 705 may be an example of aspects of a PRT configuration node 310, a network node 505, a base station 105, or a node of a core network 130 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving signals or information such as packets, user data, control information, or any combination thereof associated with various information channels (e.g., control channels, data channels, information channels related to PAPR management for relayed communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PAPR management for relayed communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of PAPR management for relayed communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication in accordance with examples as disclosed herein. For example, the communications manager 720 may be configured as or otherwise support a means for evaluating PAPR for communications from a set of user equipments (UEs) for a time interval, where the set of UEs communicate with the device 705 via a relay device. The communications manager 720 may be configured as or otherwise support a means for transmitting, to a transmitting device, an indication of a configuration for PAPR reduction signals that is based on evaluating the PAPR.

By including or configuring the communications manager 720 in accordance with examples as described herein, the device 705 (e.g., a processor controlling or otherwise coupled to the receiver 710, the transmitter 715, the communications manager 720, or a combination thereof) may support various techniques for PAPR reduction of relayed communications. In some examples, a lower PAPR of such communications may support a lower peak power or power consumption by a relay device, a lower transmission power or lower transmission power rating of a relay device, improved receiver sensitivity (e.g., of a relay device, of a receiving node), among other benefits.

Figure 8:
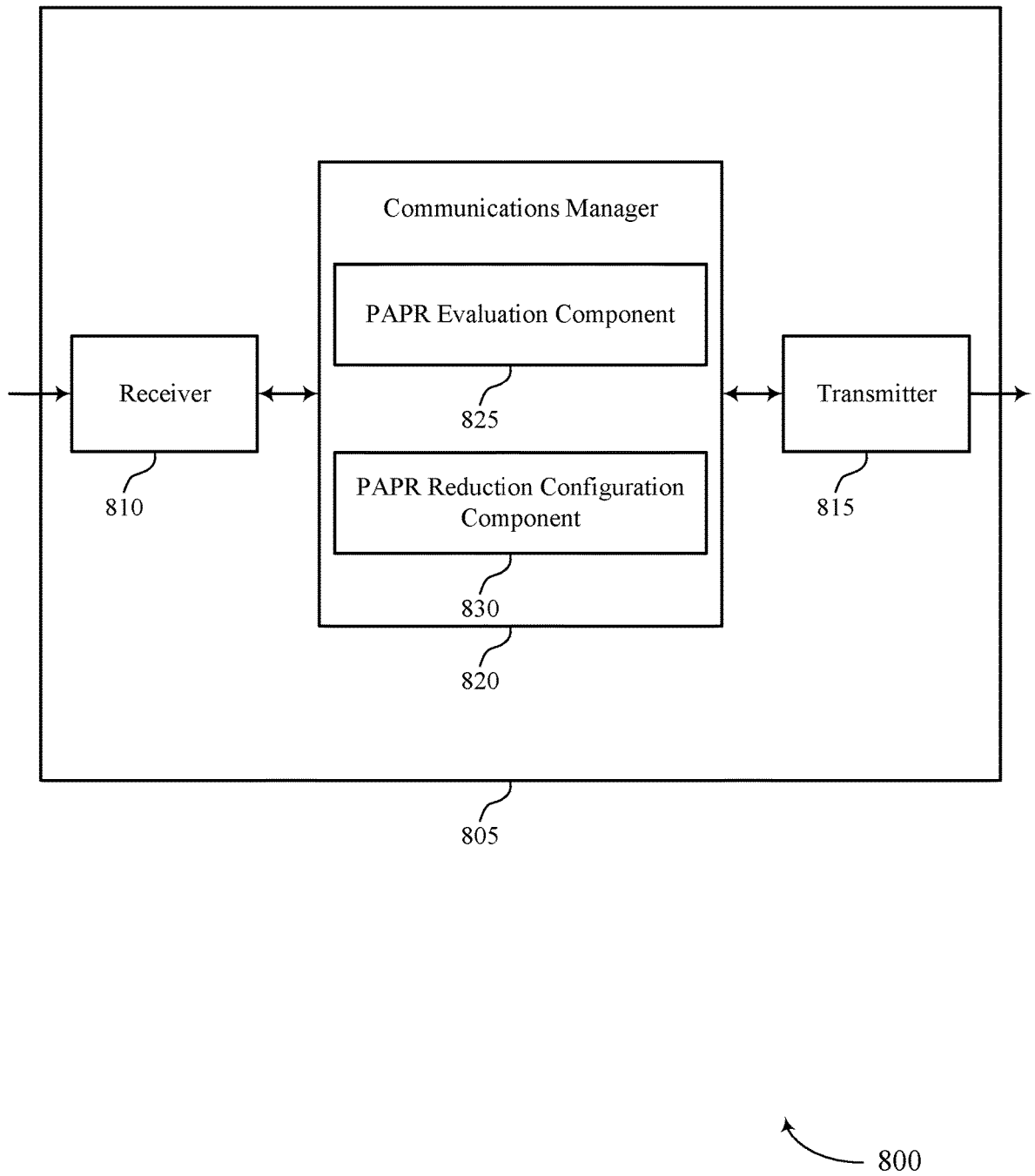

FIG. 8 shows a block diagram 800 of a device 805 that supports PAPR management for relayed communications in accordance with aspects of the present disclosure. The device 805 may be an example of aspects of a device 705, a PRT configuration node 310, a network node 505, a base station 105, or a node of a core network 130 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving signals or information such as packets, user data, control information, or any combination thereof associated with various information channels (e.g., control channels, data channels, information channels related to PAPR management for relayed communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PAPR management for relayed communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of PAPR management for relayed communications as described herein. For example, the communications manager 820 may include a PAPR evaluation component 825 a PAPR reduction configuration component 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication in accordance with examples as disclosed herein. The PAPR evaluation component 825 may be configured as or otherwise support a means for evaluating PAPR for communications from a set of UEs for a time interval, where the set of UEs communicate with the device 805 via a relay device. The PAPR reduction configuration component 830 may be configured as or otherwise support a means for transmitting, to a transmitting device, an indication of a configuration for PAPR reduction signals that is based on evaluating the PAPR.

Figure 9:
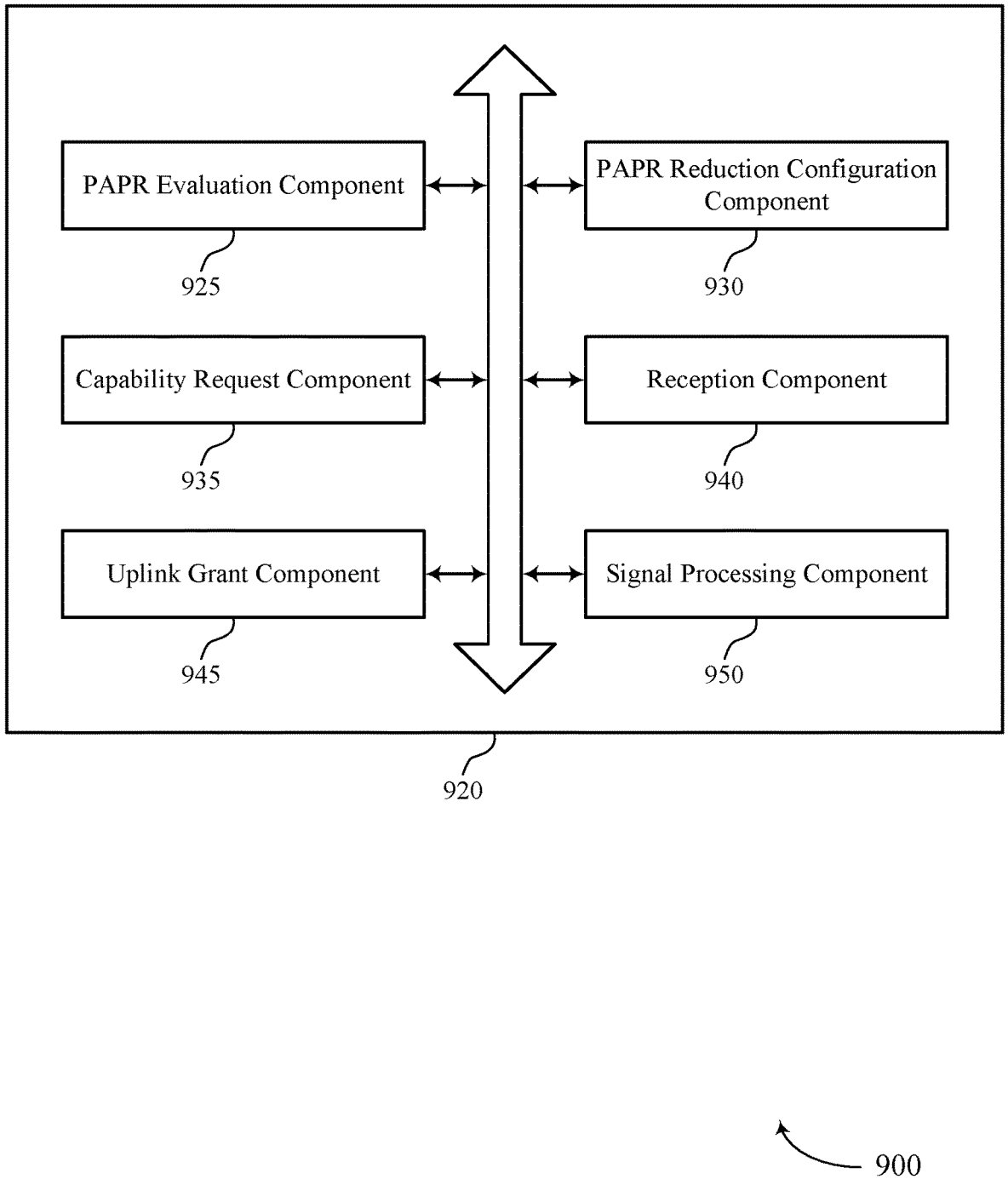
FIG. 9 shows a block diagram of a communications manager that supports PAPR management for relayed communications in accordance with aspects of the present disclosure.

FIG. 9 shows a block diagram 900 of a communications manager 920 that supports PAPR management for relayed communications in accordance with aspects of the present disclosure. The communications manager 920 may be an example of aspects of a communications manager 720, a communications manager 820, or both, as described herein. The communications manager 920, or various components thereof, may be an example of means for performing various aspects of PAPR management for relayed communications as described herein. For example, the communications manager 920 may include a PAPR evaluation component 925, a PAPR reduction configuration component 930, a capability request component 935, a reception component 940, an uplink grant component 945, a signal processing component 950, or any combination thereof. Each of these components may communicate, directly or indirectly, with one another (e.g., via one or more buses).

The communications manager 920 may support wireless communication in accordance with examples as disclosed herein. The PAPR evaluation component 925 may be configured as or otherwise support a means for evaluating, at a network node, PAPR for communications from a set of UEs for a time interval, where the set of UEs communicate with the network node via a relay device. The PAPR reduction configuration component 930 may be configured as or otherwise support a means for transmitting, by the network node and to a transmitting device, an indication of a configuration for PAPR reduction signals that is based on evaluating the PAPR.

In some examples, to support evaluating PAPR for the communications from the set of UEs, the PAPR evaluation component 925 may be configured as or otherwise support a means for evaluating PAPR for a composite signal that includes respective communications from each UE of the set of multiple UEs for the time interval. In some examples, to support transmitting the indication of the configuration for PAPR reduction signals, the PAPR reduction configuration component 930 may be configured as or otherwise support a means for transmitting an indication of a cell-specific or group-specific PAPR reduction scheme based on evaluating PAPR for the composite signal.

In some examples, the capability request component 935 may be configured as or otherwise support a means for transmitting, to the transmitting device, a request for capability information associated with support of PAPR reduction, and the configuration for PAPR reduction signals may be based on a response to the request for capability information associated with support of PAPR reduction.

In some examples, to support transmitting the indication of the configuration for PAPR reduction signals, the PAPR reduction configuration component 930 may be configured as or otherwise support a means for transmitting, to one or more UEs of the set of UEs, an indication of PAPR reduction signals for transmission during the time interval by the one or more UEs of the set of UEs.

In some examples, the uplink grant component 945 may be configured as or otherwise support a means for transmitting, to each UE of the one or more UEs, a first uplink grant associated with a portion of the communications from the each UE for the time interval and a second uplink grant including the indication of PAPR reduction signals for transmission during the time interval.

In some examples, the first uplink grant may configurable to indicate a first transmission power for the each UE, and the second uplink grant may configurable to indicate a second transmission power for the each UE that is different than the first transmission power, or a rate matching pattern associated with a PAPR reduction signal, or both.

In some examples, to support transmitting the indication of the configuration for PAPR reduction signals, the PAPR reduction configuration component 930 may be configured as or otherwise support a means for transmitting, to one or more UEs not included in the set of UEs, an indication of PAPR reduction signals for transmission during the time interval by the one or more UEs not included in the set of UEs.

In some examples, to support transmitting the indication of the configuration for PAPR reduction signals, the PAPR reduction configuration component 930 may be configured as or otherwise support a means for transmitting, to a set of multiple UEs, an indication of PAPR reduction signals for transmission during the time interval by each of the set of multiple UEs (e.g., using a same resource in the time domain and frequency domain).

In some examples, to support transmitting the indication of the configuration for PAPR reduction signals, the PAPR reduction configuration component 930 may be configured as or otherwise support a means for transmitting, to the relay device, an indication of PAPR reduction signals for transmission during the time interval by the relay device.

In some examples, the configuration for PAPR reduction signals may be based on a bandwidth of the communications from the set of UEs.

In some examples, the configuration for PAPR reduction signals may be based on a transmission bandwidth of the relay device.

In some examples, the configuration for PAPR reduction signals may be based on a PAPR reduction, a UE capability associated with PAPR reduction, or a PAPR target for a transmission by the relay device, or a PAPR reduction, a PAPR reduction capability, or a PAPR target for a reception by the relay device, or a combination thereof.

In some examples, the configuration for PAPR reduction signals may indicate a frequency resource that is not used for the communications from the set of UEs.

In some examples, the configuration for PAPR reduction signals may be based on a numerology, a waveform, an adjacent channel leakage ratio, a guard band configuration, a UE capability indication, a UE power class, a bandwidth of an active bandwidth part, a number of transmit antennas, a link budget requirement, or a combination thereof.

In some examples, the reception component 940 may be configured as or otherwise support a means for receiving, from the relay device, signals including the communications from the UEs and one or more PAPR reduction signals in accordance with the indicated configuration.

In some examples, the signal processing component 950 may be configured as or otherwise support a means for demultiplexing communications signaling associated with the communications from the received signals. In some examples, the signal processing component 950 may be configured as or otherwise support a means for processing the communications signaling independent of the one or more PAPR reduction signals to obtain data streams, control information, reference signals, or a combination thereof from the set of UEs.

Figure 10:
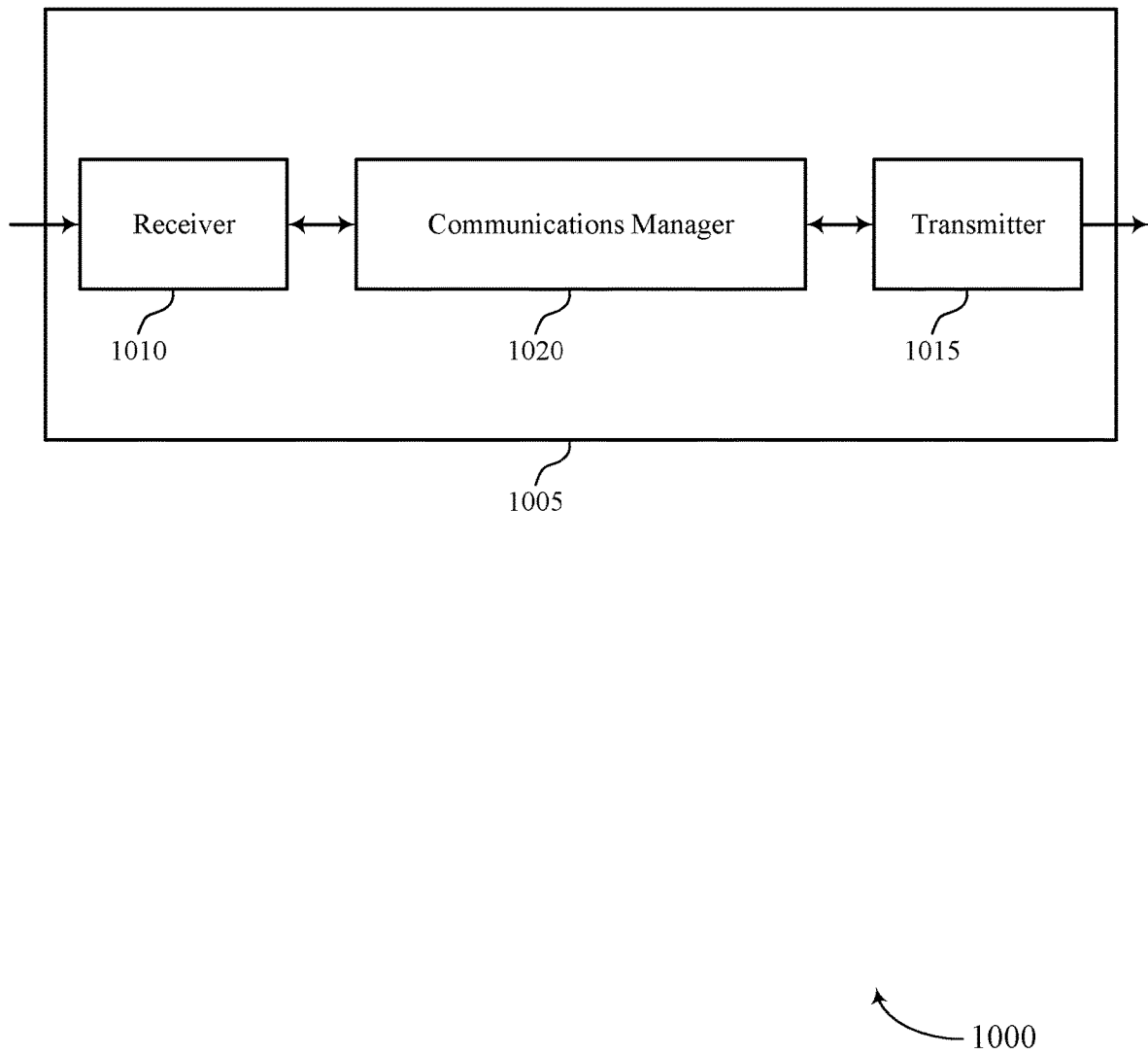
FIGS. 10 and 11 show block diagrams of devices that support PAPR management for relayed communications in accordance with aspects of the present disclosure.

FIG. 10 shows a block diagram 1000 of a device 1005 that supports PAPR management for relayed communications in accordance with aspects of the present disclosure. The device 1005 may be an example of aspects of a relay device as described herein. For example, the device 1005 may be an example of a base station 105, a UE 115, an IAB device, a sidelink relay device, a satellite 160, or some other device configured to relay signals or communication from one device to another. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving signals or information such as packets, user data, control information, or any combination thereof associated with various information channels (e.g., control channels, data channels, information channels related to PAPR management for relayed communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to PAPR management for relayed communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of PAPR management for relayed communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. For example, the communications manager 1020 may be configured as or otherwise support a means for receiving, from a network node, an indication of a PAPR reduction configuration. The communications manager 1020 may be configured as or otherwise support a means for receiving, from a set of one or more UEs, communications to be forwarded by the device 1005. The communications manager 1020 may be configured as or otherwise support a means for generating a PAPR reduction signal based on the PAPR reduction configuration. The communications manager 1020 may be configured as or otherwise support a means for transmitting signaling including the communications and the generated PAPR reduction signal.

By including or configuring the communications manager 1020 in accordance with examples as described herein, the device 1005 (e.g., a processor controlling or otherwise coupled to the receiver 1010, the transmitter 1015, the communications manager 1020, or a combination thereof)

may support various techniques for PAPR reduction of relayed communications. In some examples, a lower PAPR of such communications may support a lower peak power or power consumption by a relay device, a lower transmission power or lower transmission power rating of a relay device, improved receiver sensitivity (e.g., of a relay device, of a receiving node), among other benefits.

Figure 11:
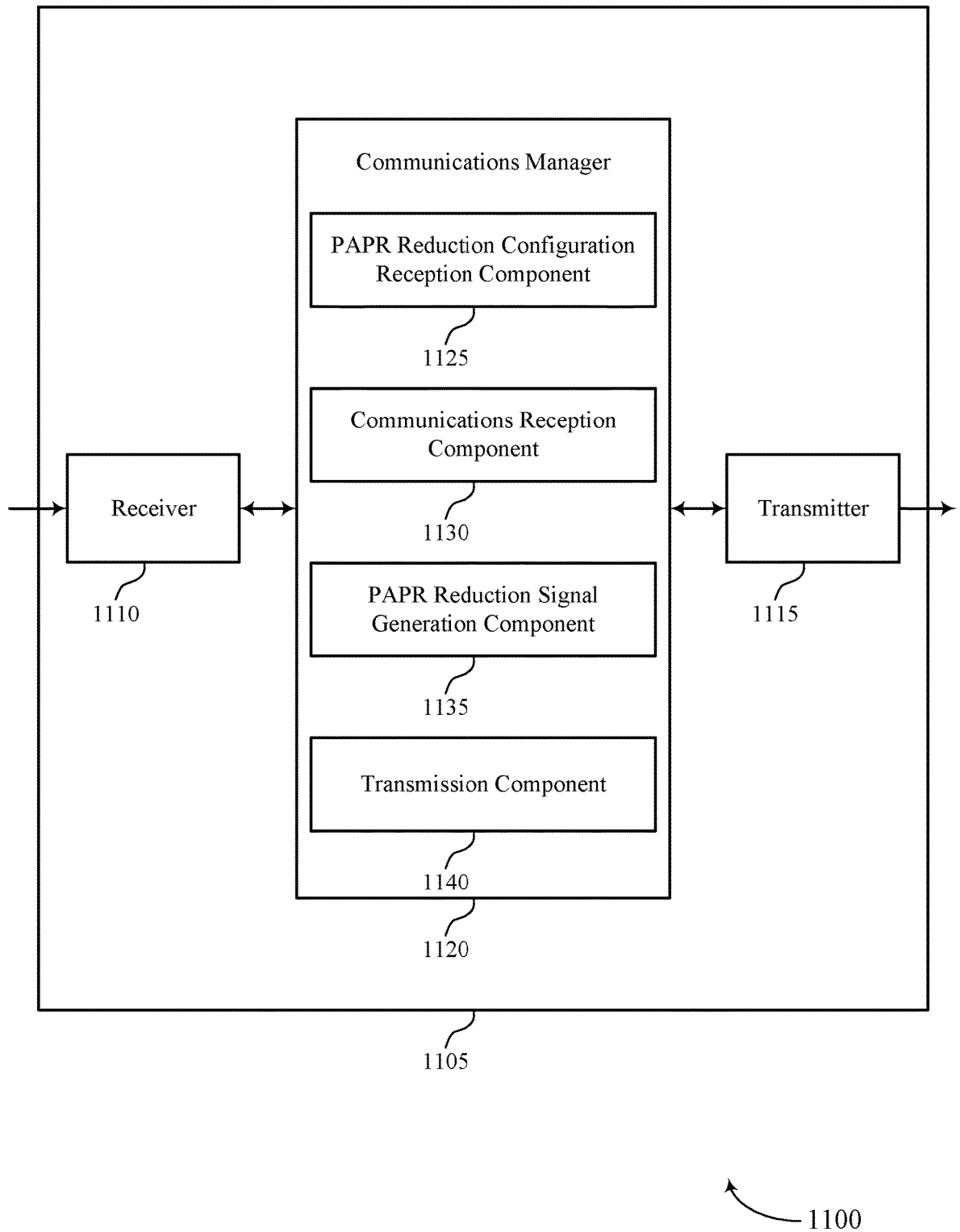

FIG. 11 shows a block diagram 1100 of a device 1105 that supports PAPR management for relayed communications in accordance with aspects of the present disclosure. The device 1105 may be an example of aspects of a device 1005 or a relay device as described herein. For example, the device 1105 may be an example of a base station 105, a UE 115, an IAB backhaul device, a sidelink relay device, a satellite, or some other device configured to relay signals or communication from one device to another. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving signals or information such as packets, user data, control information, or any combination thereof associated with various information channels (e.g., control channels, data channels, information channels related to PAPR management for relayed communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PAPR management for relayed communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of PAPR management for relayed communications as described herein. For example, the communications manager 1120 may include a PAPR reduction configuration reception component 1125, a communications reception component 1130, a PAPR reduction signal generation component 1135, a transmission component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication in accordance with examples as disclosed herein. The PAPR reduction configuration reception component 1125 may be configured as or otherwise support a means for receiving, from a network node, an indication of a PAPR reduction configuration. The communications reception component 1130 may be configured as or otherwise support a means for receiving, from a set of one or more UEs, communications to be forwarded by the device 1105. The PAPR reduction signal generation component 1135 may be configured as or otherwise support a means for generating a PAPR reduction signal based on the PAPR reduction configuration. The transmission component 1140 may be configured as or otherwise support a means for transmitting signaling including the communications and the generated PAPR reduction signal.

Figure 12:
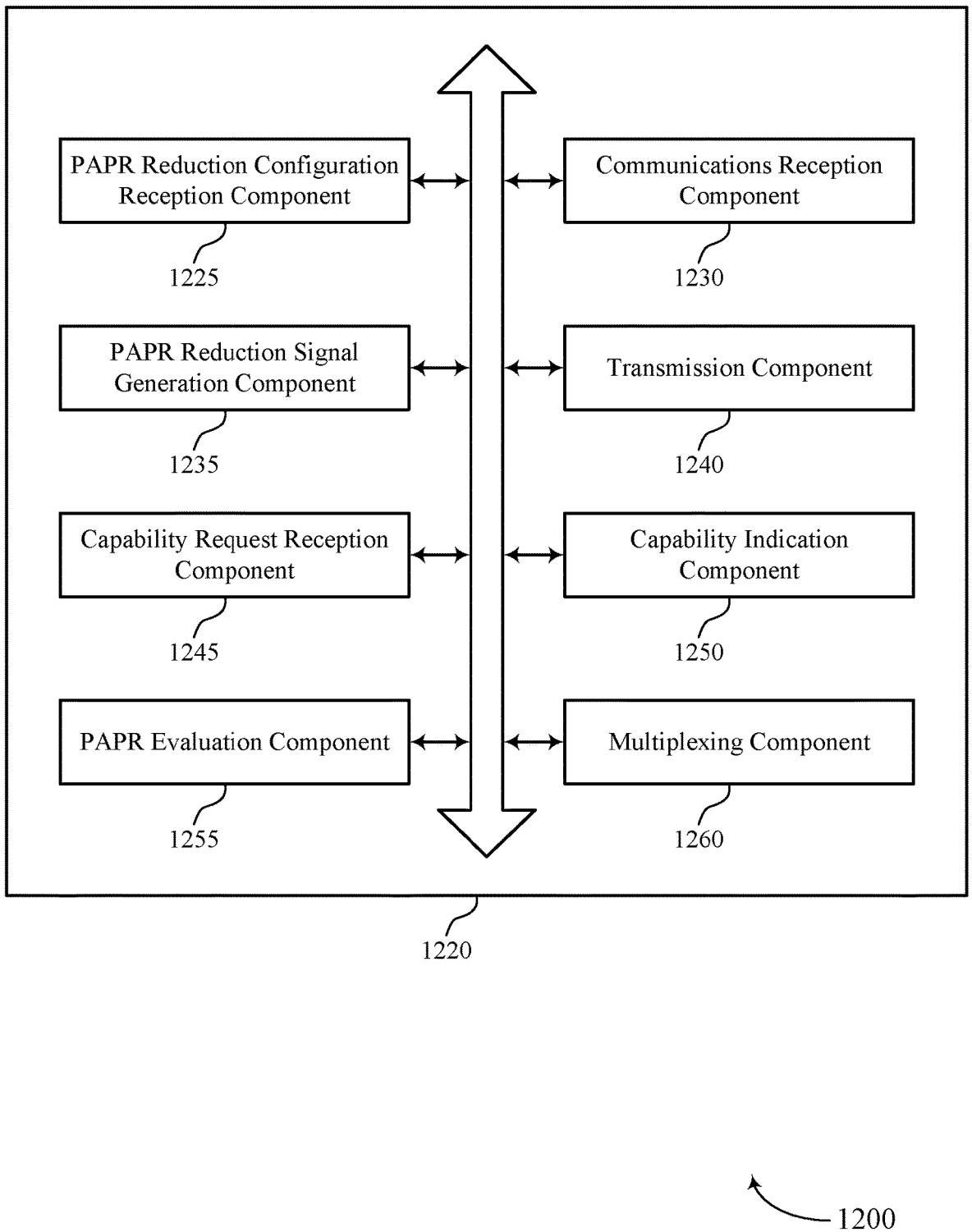
FIG. 12 shows a block diagram of a communications manager that supports PAPR management for relayed communications in accordance with aspects of the present disclosure.

FIG. 12 shows a block diagram 1200 of a communications manager 1220 that supports PAPR management for relayed communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of PAPR management for relayed communications as described herein. For example, the communications manager 1220 may include a PAPR reduction configuration reception component 1225, a communications reception component 1230, a PAPR reduction signal generation component 1235, a transmission component 1240, a capability request reception component 1245, a capability indication component 1250, a PAPR evaluation component 1255, a multiplexing component 1260, or any combination thereof. Each of these components may communicate, directly or indirectly, with one another (e.g., via one or more buses).

The communications manager 1220 may support wireless communication in accordance with examples as disclosed herein. The PAPR reduction configuration reception component 1225 may be configured as or otherwise support a means for receiving, at a relay device and from a network node, an indication of a PAPR reduction configuration. The communications reception component 1230 may be configured as or otherwise support a means for receiving, at the relay device and from a set of one or more UEs, communications to be forwarded by the relay device. The PAPR reduction signal generation component 1235 may be configured as or otherwise support a means for generating a PAPR reduction signal based on the PAPR reduction configuration. The transmission component 1240 may be configured as or otherwise support a means for transmitting signaling including the communications and the generated PAPR reduction signal.

In some examples, to support receiving the indication of the PAPR reduction configuration, the PAPR reduction configuration reception component 1225 may be configured as or otherwise support a means for receiving an indication of a frequency resource allocated for PAPR reduction signals. In some examples, to support generating the PAPR reduction signal, the PAPR reduction signal generation component 1235 may be configured as or otherwise support a means for generating the PAPR reduction signal for transmission using the frequency resource.

In some examples, the capability request reception component 1245 may be configured as or otherwise support a means for receiving, from the network node, a request for capability information associated with support of PAPR reduction. In some examples, the capability indication component 1250 may be configured as or otherwise support a means for transmitting, to the network node, a response indicating a capability of the relay device to support the PAPR reduction, where receiving the indication of the PAPR reduction configuration is based on the response.

In some examples, the PAPR evaluation component 1255 may be configured as or otherwise support a means for evaluating, at the relay device, PAPR of the received communications to be forwarded by the relay device. In some examples, the PAPR reduction signal generation component 1235 may be configured as or otherwise support a means for generating the PAPR reduction signal based on evaluating PAPR of the received communications.

In some examples, to support receiving the indication of the PAPR reduction configuration, the PAPR reduction configuration reception component 1225 may be configured as or otherwise support a means for receiving a command to multiplex PAPR reduction signals with the communications to be forwarded by the relay device.

In some examples, the command may include an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

In some examples, the multiplexing component 1260 may be configured as or otherwise support a means for multiplexing the communications with the generated PAPR reduction signal, where transmitting the signaling includes transmitting the multiplexed communications and generated PAPR reduction signal.

Figure 13:
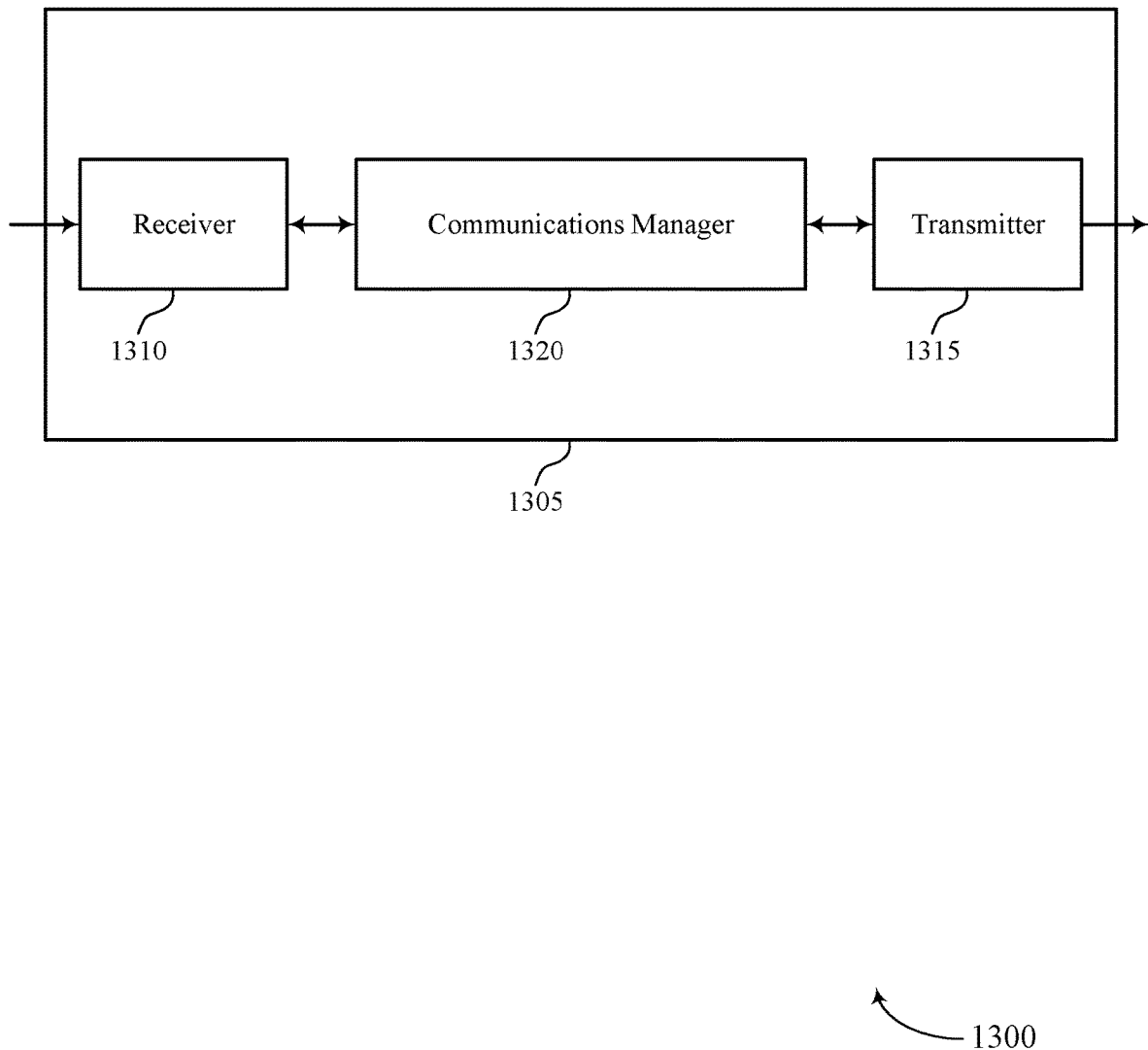
FIGS. 13 and 14 show block diagrams of devices that support PAPR management for relayed communications in accordance with aspects of the present disclosure.

FIG. 13 shows a block diagram 1300 of a device 1305 that supports PAPR management for relayed communications in accordance with aspects of the present disclosure. The device 1305 may be an example of aspects of a transmitting device 210, such as a UE 115, a base station 105, or a satellite 160 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving signals or information such as packets, user data, control information, or any combination thereof associated with various information channels (e.g., control channels, data channels, information channels related to PAPR management for relayed communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to PAPR management for relayed communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of PAPR management for relayed communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication in accordance with examples as disclosed herein. For example, the communications manager 1320 may be configured as or otherwise support a means for receiving a command from a network node to perform a PAPR reduction transmission to a relay device. The communications manager 1320 may be configured as or otherwise support a means for generating a PAPR reduction signal for a time interval based on the received command. The communications manager 1320 may be configured as or otherwise support a means for transmitting the generated PAPR reduction signal to the relay device during the time interval.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support various techniques for PAPR reduction of relayed communications. In some examples, a lower PAPR of such communications may support a lower peak power or power consumption by a relay device, a lower transmission power or lower transmission power rating of a relay device, improved receiver sensitivity (e.g., of a relay device, of a receiving node), among other benefits.

Figure 14:
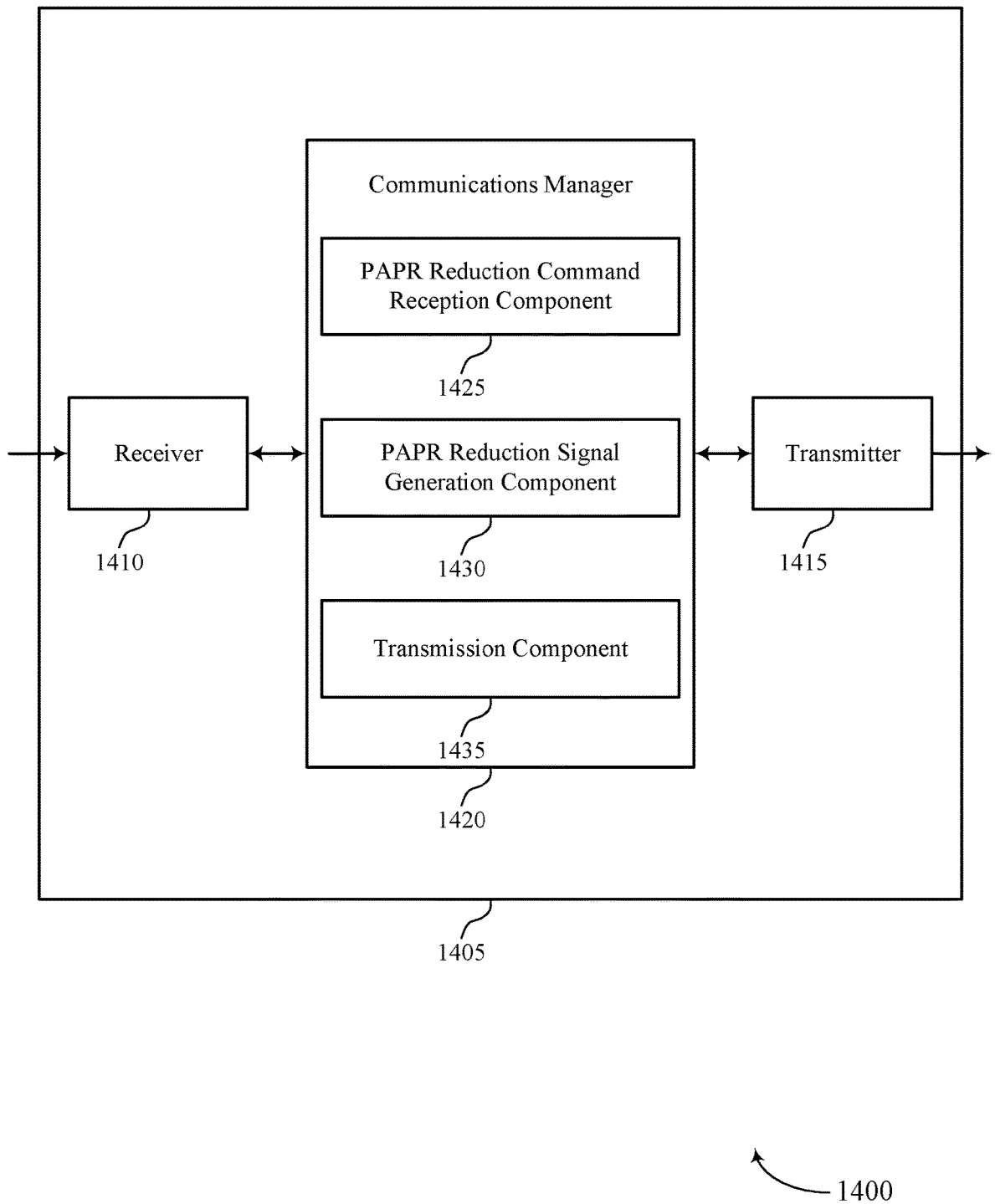

FIG. 14 shows a block diagram 1400 of a device 1405 that supports PAPR management for relayed communications in accordance with aspects of the present disclosure. The device 1405 may be an example of aspects of a device 1305 or a transmitting device 210, such as a UE 115, a base station 105, or a satellite 160 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to PAPR management for relayed communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to PAPR management for relayed communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of PAPR management for relayed communications as described herein. For example, the communications manager 1420 may include a PAPR reduction command reception component 1425, a PAPR reduction signal generation component 1430, a transmission component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication in accordance with examples as disclosed herein. The PAPR reduction command reception component 1425 may be configured as or otherwise support a means for receiving a command from a network node to perform a PAPR reduction transmission to a relay device. The PAPR reduction signal generation component 1430 may be configured as or otherwise support a means for generating a PAPR reduction signal for a time interval based on the received command. The transmission component 1435 may be configured as or otherwise support a means for transmitting the generated PAPR reduction signal to the relay device during the time interval.

Figure 15:
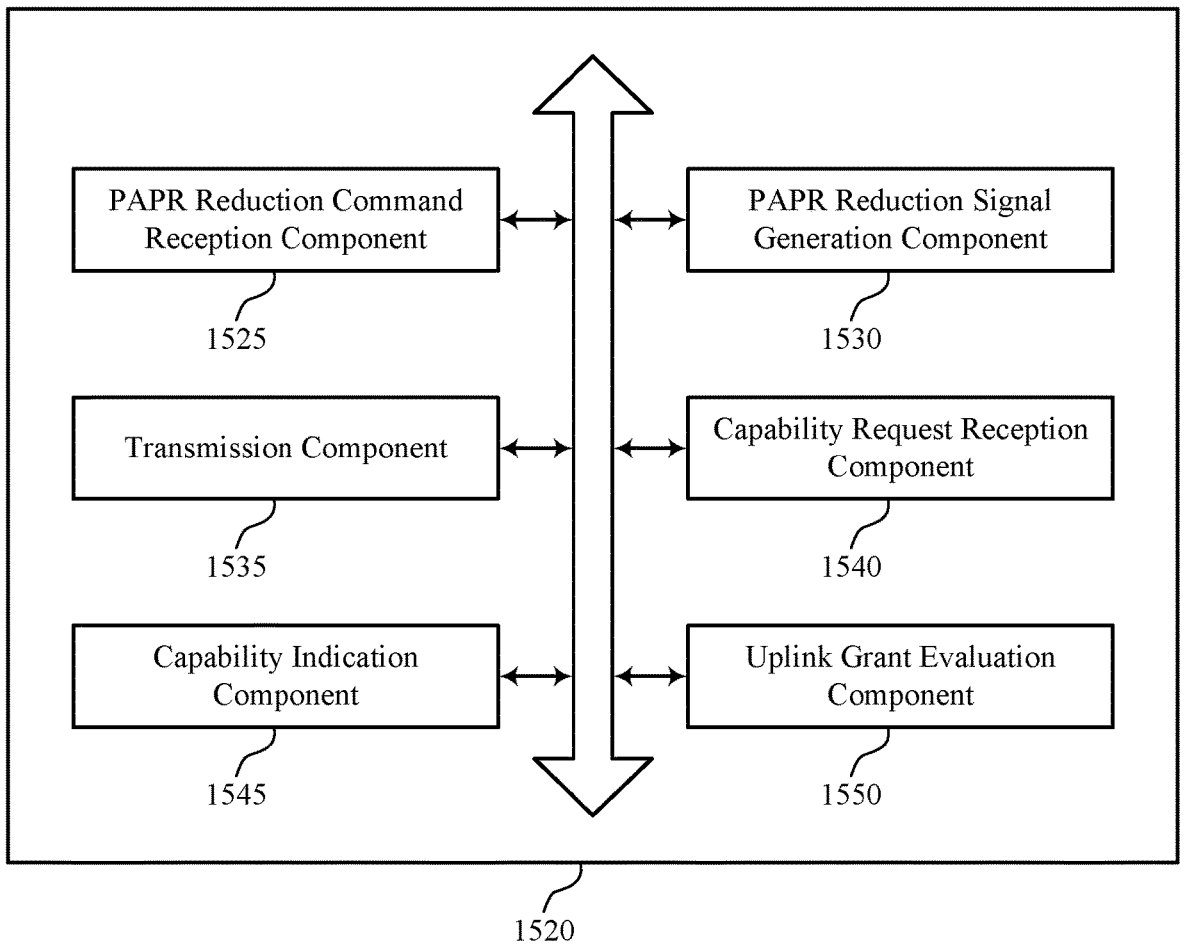
FIG. 15 shows a block diagram of a communications manager that supports PAPR management for relayed communications in accordance with aspects of the present disclosure.

FIG. 15 shows a block diagram 1500 of a communications manager 1520 that supports PAPR management for relayed communications in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of PAPR management for relayed communications as described herein. For example, the communications manager 1520 may include a PAPR reduction command reception component 1525, a PAPR reduction signal generation component 1530, a transmission component 1535, a capability request reception component 1540, a capability indication component 1545, an uplink grant evaluation component 1550, or any combination thereof. Each of these components may communicate, directly or indirectly, with one another (e.g., via one or more buses).

The communications manager 1520 may support wireless communication in accordance with examples as disclosed herein. The PAPR reduction command reception component 1525 may be configured as or otherwise support a means for receiving, at a UE, a command from a network node to perform a PAPR reduction transmission to a relay device. The PAPR reduction signal generation component 1530 may be configured as or otherwise support a means for generating a PAPR reduction signal for a time interval based on the received command. The transmission component 1535 may be configured as or otherwise support a means for transmitting the generated PAPR reduction signal to the relay device during the time interval.

In some examples, the capability request reception component 1540 may be configured as or otherwise support a means for receiving, from the network node, a request for capability information associated with support of PAPR reduction. In some examples, the capability indication component 1545 may be configured as or otherwise support a means for transmitting, to the network node, a response indicating a capability of the UE to support the PAPR reduction, where receiving the command to perform the PAPR reduction transmission is based on transmitting the response.

In some examples, the uplink grant evaluation component 1550 may be configured as or otherwise support a means for receiving, at the UE, a first uplink grant associated with uplink communications from the UE to the relay device and a second uplink grant including the command to perform a PAPR reduction transmission to the relay device. In some examples, the transmission component 1535 may be configured as or otherwise support a means for transmitting, to the relay device, the generated PAPR reduction signal concurrently with the uplink communications.

In some examples, the first uplink grant indicates a first transmission power for communications from the UE to the relay device and the second uplink grant indicates a second transmission power for the generated PAPR reduction signal that is different than the first transmission power.

In some examples, the time interval may not be associated with uplink communications from the UE to the relay device.

In some examples, the command may include an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

Figure 16:
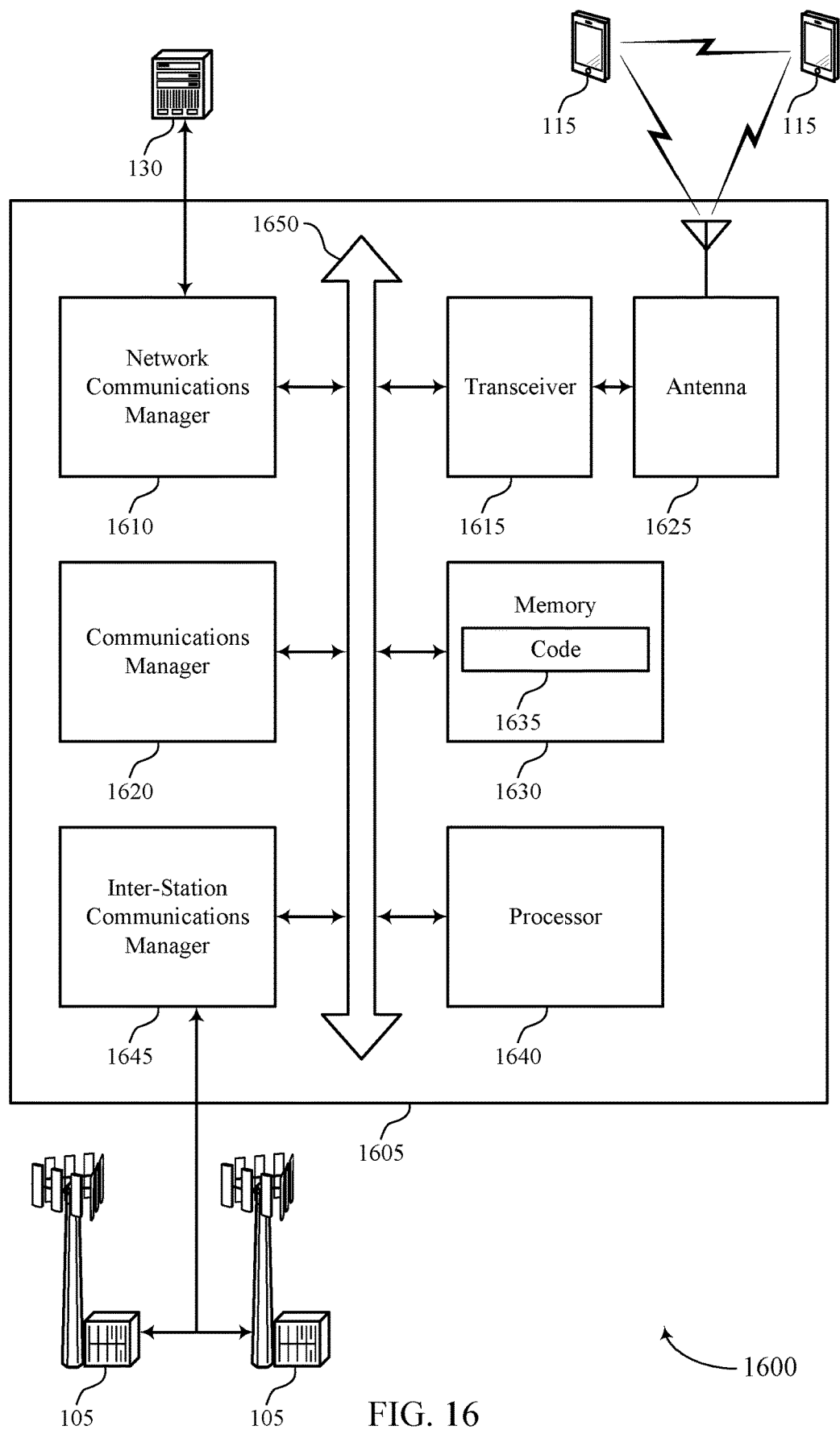
FIG. 16 shows a diagram of a system including a device that supports PAPR management for relayed communications in accordance with aspects of the present disclosure.

FIG. 16 shows a diagram of a system 1600 including a device 1605 that supports PAPR management for relayed communications in accordance with aspects of the present disclosure. The device 1605 may be an example of or include the components of a device 705, a device 805, a device 1005, a device 1105, a device 1305, a device 1405 as described herein. The device 1605 may communicate wirelessly with one or more base stations 105, UEs 115, satellites 160, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 715, a transmitter 815, a receiver 710, a receiver 810, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting PAPR management for relayed communications). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication in accordance with examples as disclosed herein. For example, the communications manager 1620 may be configured as or otherwise support a means for evaluating (e.g., at a network node) PAPR for communications from a set of UEs for a time interval, where the set of UEs communicate with the device 1605 via a relay device. The communications manager 1620 may be configured as or otherwise support a means for transmitting, to a transmitting device, an indication of a configuration for PAPR reduction signals that is based on evaluating the PAPR.

Additionally, or alternatively, the communications manager 1620 may be configured as or otherwise support a means for receiving (e.g., at a relay device) from a network node, an indication of a PAPR reduction configuration, and receiving from a set of one or more UEs, communications to be forwarded by the device 1605. The communications manager 1620 may be configured as or otherwise support a means for generating a PAPR reduction signal based at least in part on the PAPR reduction configuration, and transmitting signaling including the communications and the generated PAPR reduction signal.

Additionally, or alternatively, the communications manager 1620 may be configured as or otherwise support a means for receiving a command from a network node to perform a peak-to-average power ratio (PAPR) reduction transmission to a relay device, and generating a PAPR reduction signal for a time interval based at least in part on the received command. The communications manager 1620 may be configured as or otherwise support a means for transmitting the generated PAPR reduction signal to the relay device during the time interval.

By including or configuring the communications manager 1620 in accordance with examples as described herein, the device 1605 may support techniques for PAPR reduction of relayed communications. In some examples, a lower PAPR of such communications may support a lower peak power or power consumption by a relay device, a lower transmission power or lower transmission power rating of a relay device, improved receiver sensitivity (e.g., of a relay device, of a receiving node), among other benefits.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor

1640, the memory 1630, the code 1635, or any combination thereof. For example, the code 1635 may include instructions executable by the processor 1640 to cause the device 1605 to perform various aspects of PAPR management for relayed communications as described herein, or the processor 1640 and the memory 1630 may be otherwise configured to perform or support such operations.

Figure 17:
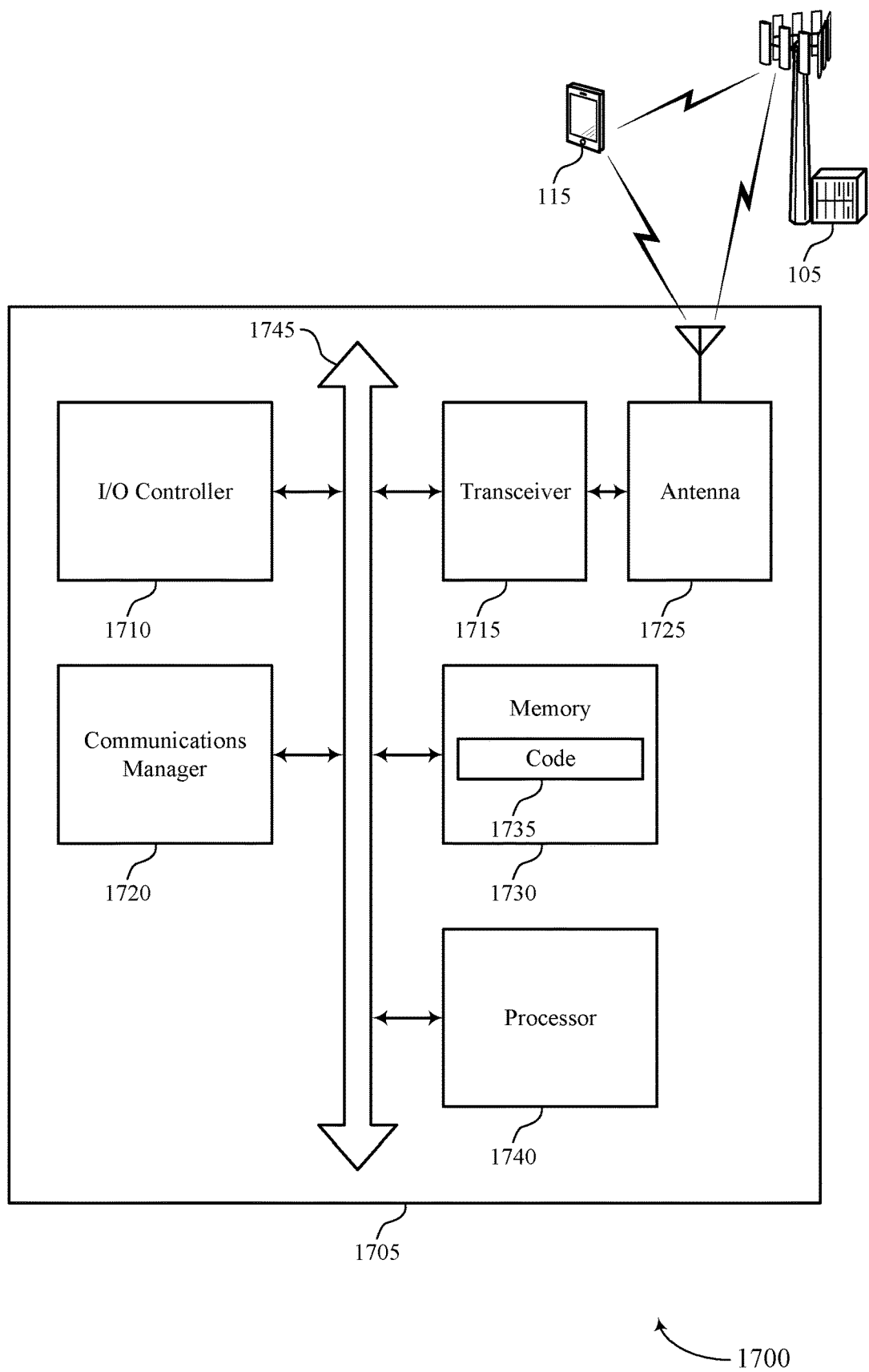
FIG. 17 shows a diagram of a system including a device that supports PAPR management for relayed communications in accordance with aspects of the present disclosure.

FIG. 17 shows a diagram of a system 1700 including a device 1705 that supports PAPR management for relayed communications in accordance with aspects of the present disclosure. The device 1705 may be an example of or include the components of a device 1005, a device 1105, a device 1305, a device 1405, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1315, a transmitter 1415, a receiver 1310, a receiver 1410, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting PAPR management for relayed communications). For example, the device 1705 or a component of the device 1705 may include a processor 1740 and memory 1730 coupled to the processor 1740, the processor 1740 and memory 1730 configured to perform various functions described herein.

The communications manager 1720 may support wireless communication in accordance with examples as disclosed herein. For example, the communications manager 1720 may be configured as or otherwise support a means for receiving, at a UE, a command from a network node to perform a PAPR reduction transmission to a relay device. The communications manager 1720 may be configured as or otherwise support a means for generating a PAPR reduction signal for a time interval based on the received command. The communications manager 1720 may be configured as or otherwise support a means for transmitting the generated PAPR reduction signal to the relay device during the time interval.

Additionally, or alternatively, the communications manager 1720 may be configured as or otherwise support a means for receiving (e.g., at a relay device) from a network node, an indication of a PAPR reduction configuration, and receiving from a set of one or more UEs, communications to be forwarded by the device 1705. The communications manager 1720 may be configured as or otherwise support a means for generating a PAPR reduction signal based at least in part on the PAPR reduction configuration, and transmitting signaling including the communications and the generated PAPR reduction signal.

By including or configuring the communications manager 1720 in accordance with examples as described herein, the device 1705 may support various techniques for PAPR reduction of relayed communications. In some examples, a lower PAPR of such communications may support a lower peak power or power consumption by a relay device, a lower transmission power or lower transmission power rating of a relay device, improved receiver sensitivity (e.g., of a relay device, of a receiving node), among other benefits.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of PAPR management for relayed communications as described herein, or the processor 1740 and the memory 1730 may be otherwise configured to perform or support such operations.

Figure 18:
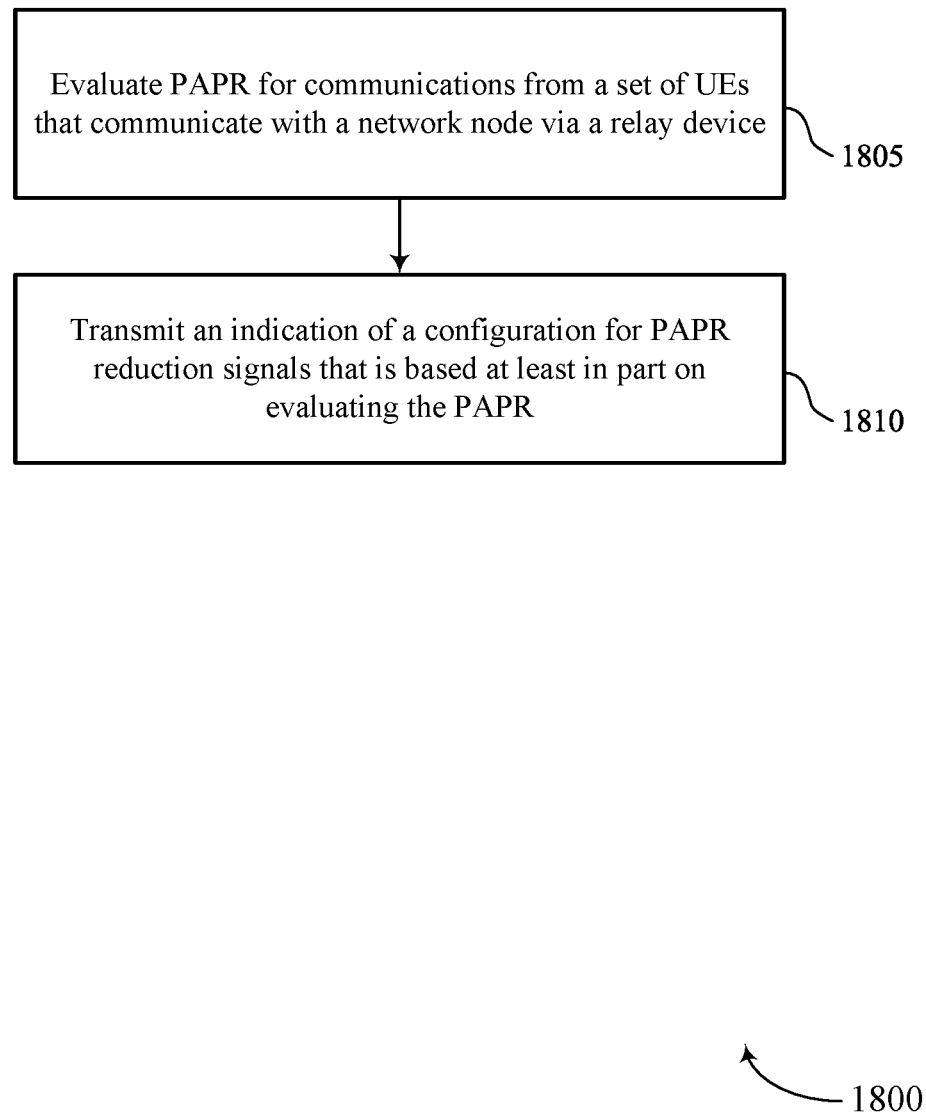
FIGS. 18 through 20 show flowcharts illustrating methods that support PAPR management for relayed communications in accordance with aspects of the present disclosure.

FIG. 18 shows a flowchart illustrating a method 1800 that supports PAPR management for relayed communications in accordance with aspects of the present disclosure. The operations of the method 1800 may be implemented by a base station or its components as described herein. For example, the operations of the method 1800 may be performed by a base station 105 or other network node as described with reference to FIGS. 1 through 16. In some examples, a base station may execute a set of instructions to control the functional elements of the base station to perform the described functions. Additionally, or alternatively, the base station may perform aspects of the described functions using special-purpose hardware.

At 1805, the method may include evaluating (e.g., at a network node) PAPR for communications (e.g., for a time interval) from a set of UEs that communicate with a network node via a relay device. The operations of 1805 may be performed in accordance with examples as disclosed herein. In some examples, aspects of the operations of 1805 may be performed by a PAPR evaluation component 925 as described with reference to FIG. 9.

At 1810, the method may include transmitting (e.g., by the network node, to a transmitting device) an indication of a configuration for PAPR reduction signals that is based on evaluating the PAPR. The operations of 1810 may be performed in accordance with examples as disclosed herein. In some examples, aspects of the operations of 1810 may be performed by a PAPR reduction configuration component 930 as described with reference to FIG. 9.

Figure 19:
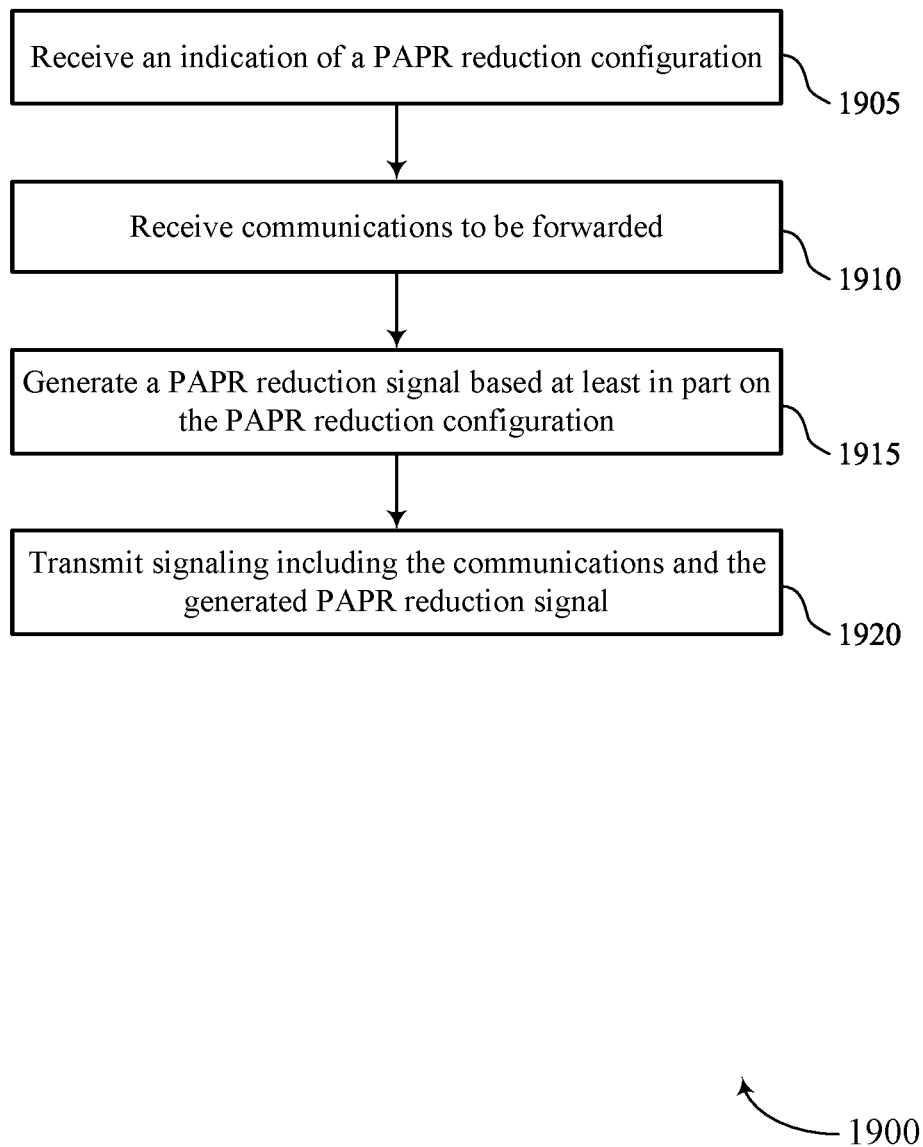

FIG. 19 shows a flowchart illustrating a method 1900 that supports PAPR management for relayed communications in accordance with aspects of the present disclosure. The operations of the method 1900 may be implemented by a relay device or its components as described herein. For example, the operations of the method 1900 may be performed by a relay device as described with reference to FIGS. 1 through 6, 10 through 12, 16 or 17. In some examples, a relay device may execute a set of instructions to control the functional elements of the relay device to perform the described functions. Additionally, or alternatively, the relay device may perform aspects of the described functions using special-purpose hardware.

At 1905, the method may include receiving (e.g., at a relay device, from a network node) an indication of a PAPR reduction configuration. The operations of 1905 may be performed in accordance with examples as disclosed herein. In some examples, aspects of the operations of 1905 may be performed by a PAPR reduction configuration reception component 1225 as described with reference to FIG. 12.

At 1910, the method may include receiving (e.g., at the relay device, from a set of one or more UEs) communications to be forwarded. The operations of 1910 may be performed in accordance with examples as disclosed herein. In some examples, aspects of the operations of 1910 may be performed by a communications reception component 1230 as described with reference to FIG. 12.

At 1915, the method may include generating a PAPR reduction signal based on the PAPR reduction configuration. The operations of 1915 may be performed in accordance with examples as disclosed herein. In some examples, aspects of the operations of 1915 may be performed by a PAPR reduction signal generation component 1235 as described with reference to FIG. 12.

At 1920, the method may include transmitting signaling including the communications and the generated PAPR reduction signal. The operations of 1920 may be performed in accordance with examples as disclosed herein. In some examples, aspects of the operations of 1920 may be performed by a transmission component 1240 as described with reference to FIG. 12.

Figure 20:
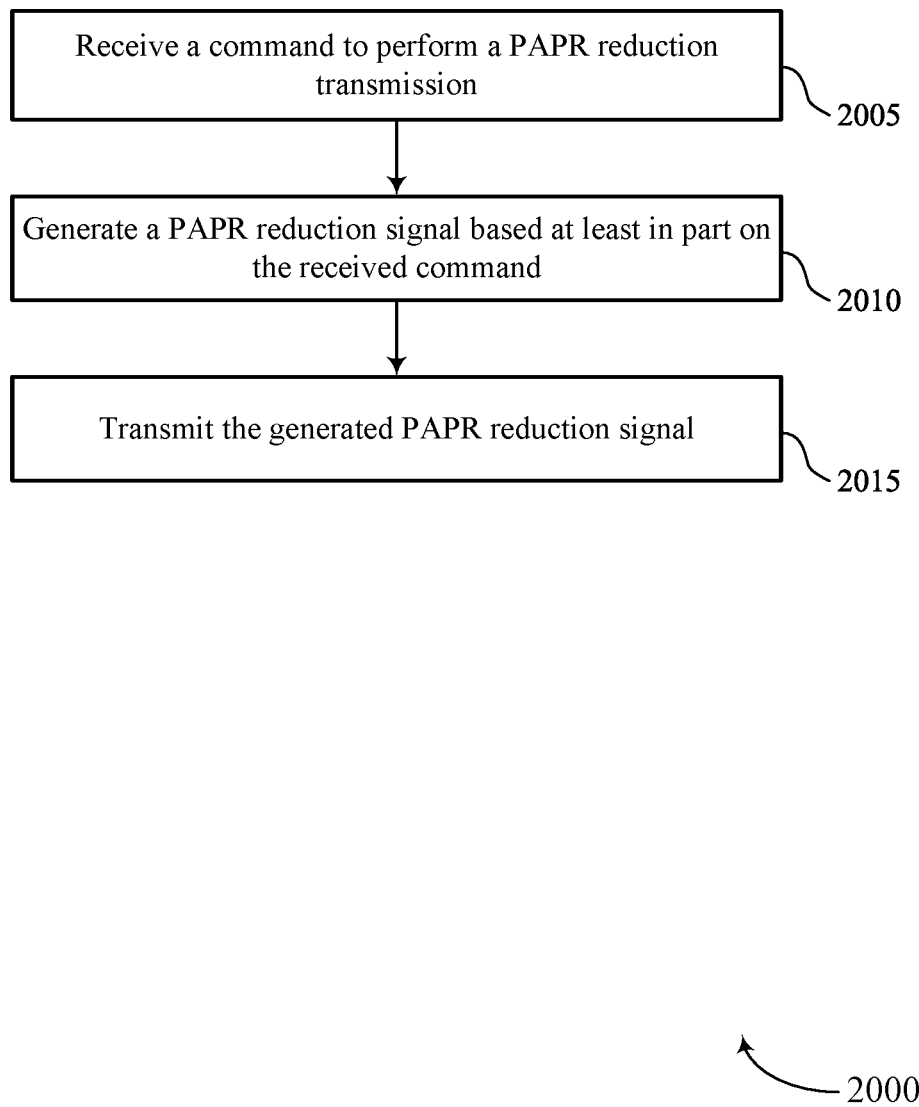

FIG. 20 shows a flowchart illustrating a method 2000 that supports PAPR management for relayed communications in accordance with aspects of the present disclosure. The operations of the method 2000 may be implemented by a transmitting device 210 or its components as described herein. For example, the operations of the method 2000 may be performed by a UE 115 as described with reference to FIGS. 1 through 6 and 13 through 17. In some examples, a transmitting device 210 may execute a set of instructions to control the functional elements of the transmitting device 210 to perform the described functions. Additionally, or alternatively, the transmitting device 210 may perform aspects of the described functions using special-purpose hardware.

At 2005, the method may include receiving (e.g., at a UE, from a network node) a command to perform a PAPR reduction transmission (e.g., to a relay device). The operations of 2005 may be performed in accordance with examples as disclosed herein. In some examples, aspects of the operations of 2005 may be performed by a PAPR reduction command reception component 1525 as described with reference to FIG. 15.

At 2010, the method may include generating a PAPR reduction signal (e.g., for a time interval) based on the received command. The operations of 2010 may be performed in accordance with examples as disclosed herein. In some examples, aspects of the operations of 2010 may be performed by a PAPR reduction signal generation component 1530 as described with reference to FIG. 15.

At 2015, the method may include transmitting the generated PAPR reduction signal (e.g., to the relay device, during the time interval). The operations of 2015 may be performed in accordance with examples as disclosed herein. In some examples, aspects of the operations of 2015 may be performed by a transmission component 1535 as described with reference to FIG. 15.

The following provides an overview of aspects of the present disclosure:

Aspect 1: A method for wireless communication, comprising: evaluating, at a network node, PAPR for communications from a set of UEs for a time interval, wherein the set of UEs communicate with the network node via a relay device; transmitting, by the network node and to a transmitting device, an indication of a configuration for PAPR reduction signals that is based at least in part on evaluating the PAPR.

Aspect 2: The method of aspect 1, wherein the set of UEs comprises a plurality of UEs, and wherein: evaluating PAPR for the communications from the set of UEs comprises evaluating PAPR for a composite signal that includes respective communications from each UE of the plurality of UEs for the time interval; and transmitting the indication of the configuration for PAPR reduction signals comprises transmitting an indication of a cell-specific or group-specific PAPR reduction scheme based at least in part on evaluating PAPR for the composite signal.

Aspect 3: The method of aspects 1 or 2, further comprising: transmitting, to the transmitting device, a request for capability information associated with support of PAPR reduction, wherein the configuration for PAPR reduction signals is based at least in part on a response to the request for capability information associated with support of PAPR reduction.

Aspect 4: The method of any of aspects 1 through 3, wherein transmitting the indication of the configuration for PAPR reduction signals comprises: transmitting, to one or more UEs of the set of UEs, an indication of PAPR reduction signals for transmission during the time interval by the one or more UEs of the set of UEs.

Aspect 5: The method of aspect 4, further comprising: transmitting, to each UE of the one or more UEs, a first uplink grant associated with a portion of the communications from the each UE for the time interval and a second uplink grant comprising the indication of PAPR reduction signals for transmission during the time interval.

Aspect 6: The method of aspect 5, wherein the first uplink grant is configurable to indicate a first transmission power for the each UE, and the second uplink grant is configurable to indicate a second transmission power for the each UE that is different than the first transmission power and a rate matching pattern associated with a PAPR reduction signal.

Aspect 7: The method of any of aspects 1 through 6, wherein transmitting the indication of the configuration for PAPR reduction signals comprises: transmitting, to one or more UEs not included in the set of UEs, an indication of PAPR reduction signals for transmission during the time interval by the one or more UEs not included in the set of UEs.

Aspect 8: The method of any of aspects 1 through 7, wherein transmitting the indication of the configuration for PAPR reduction signals comprises: transmitting, to a plurality of UEs, an indication of PAPR reduction signals for transmission during the time interval by each of the plurality of UEs using a same resource in the time domain and frequency domain.

Aspect 9: The method of any of aspects 1 through 8, wherein transmitting the indication of the configuration for PAPR reduction signals comprises: transmitting, to the relay device, an indication of PAPR reduction signals for transmission during the time interval by the relay device.

Aspect 10: The method of any of aspects 1 through 9, wherein the configuration for PAPR reduction signals is based at least in part on a bandwidth of the communications from the set of UEs.

Aspect 11: The method of any of aspects 1 through 10, wherein the configuration for PAPR reduction signals is based at least in part on a transmission bandwidth of the relay device.

Aspect 12: The method of any of aspects 1 through 11, wherein the configuration for PAPR reduction signals is based at least in part on a PAPR reduction or a PAPR target for a transmission by the relay device, or a PAPR reduction or a PAPR target for a reception by the relay device, or a combination thereof.

Aspect 13: The method of any of aspects 1 through 12, wherein the configuration for PAPR reduction signals indicates a frequency resource that is not used for the communications from the set of UEs.

Aspect 14: The method of any of aspects 1 through 13, wherein the configuration for PAPR reduction signals is based at least in part on a numerology, a waveform, an adjacent channel leakage ratio, a guard band configuration, a UE capability indication, a UE power class, a bandwidth of an active bandwidth part, a number of transmit antennas, or a combination thereof.

Aspect 15: The method of any of aspects 1 through 14, further comprising: receiving, from the relay device, signals comprising the communications from the UEs and one or more PAPR reduction signals in accordance with the indicated configuration.

Aspect 16: The method of aspect 15, further comprising: demultiplexing communications signaling associated with the communications from the received signals; and processing the communications signaling independent of the one or more PAPR reduction signals to obtain data streams, control information, reference signals, or a combination thereof from the set of UEs.

Aspect 17: A method for wireless communication, comprising: receiving, at a relay device and from a network node, an indication of a PAPR reduction configuration; receiving, at the relay device and from a set of one or more UEs, communications to be forwarded by the relay device; generating a PAPR reduction signal based at least in part on the PAPR reduction configuration; transmitting signaling including the communications and the generated PAPR reduction signal.

Aspect 18: The method of aspect 17, wherein: receiving the indication of the PAPR reduction configuration comprises receiving an indication of a frequency resource allocated for PAPR reduction signals; and generating the PAPR reduction signal comprises generating the PAPR reduction signal for transmission using the frequency resource.

Aspect 19: The method of aspects 17 or 18, further comprising: receiving, from the network node, a request for capability information associated with support of PAPR reduction; and transmitting, to the network node, a response indicating a capability of the relay device to support the PAPR reduction, wherein receiving the indication of the PAPR reduction configuration is based at least in part on the response.

Aspect 20: The method of any of aspects 17 through 19, further comprising: evaluating, at the relay device, PAPR of the received communications to be forwarded by the relay device; and generating the PAPR reduction signal based at least in part on evaluating PAPR of the received communications.

Aspect 21: The method of any of aspects 17 through 20, wherein receiving the indication of the PAPR reduction configuration comprises: receiving a command to multiplex PAPR reduction signals with the communications to be forwarded by the relay device.

Aspect 22: The method of aspect 21, wherein the command comprises an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

Aspect 23: The method of any of aspects 17 through 22, further comprising: multiplexing the communications with the generated PAPR reduction signal, wherein transmitting the signaling comprises transmitting the multiplexed communications and generated PAPR reduction signal.

Aspect 24: A method for wireless communication, comprising: receiving, at a UE, a command from a network node to perform a PAPR reduction transmission to a relay device; generating a PAPR reduction signal for a time interval based at least in part on the received command; and transmitting the generated PAPR reduction signal to the relay device during the time interval.

Aspect 25: The method of aspect 24, further comprising: receiving, from the network node, a request for capability information associated with support of PAPR reduction; and transmitting, to the network node, a response indicating a capability of the UE to support the PAPR reduction, wherein receiving the command to perform the PAPR reduction transmission is based at least in part on transmitting the response.

Aspect 26: The method of aspect 24 or 25, further comprising: receiving, at the UE, a first uplink grant associated with uplink communications from the UE to the relay device and a second uplink grant comprising the command to perform a PAPR reduction transmission to the relay device; and transmitting, to the relay device, the generated PAPR reduction signal concurrently with the uplink communications.

Aspect 27: The method of aspect 26, wherein the first uplink grant indicates a first transmission power for communications from the UE to the relay device and the second uplink grant indicates a second transmission power for the generated PAPR reduction signal that is different than the first transmission power.

Aspect 28: The method of any of aspects 24 through 27, wherein the time interval is not associated with uplink communications from the UE to the relay device.

Aspect 29: The method of any of aspects 24 through 28, wherein the command comprises an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

Aspect 30: An apparatus for wireless communication, comprising a processor; memory coupled with the processor; and instructions stored in the memory and executable by the processor to cause the apparatus to perform a method of any of aspects 1 through 16.

Aspect 31: An apparatus for wireless communication, comprising at least one means for performing a method of any of aspects 1 through 16.

Aspect 32: A non-transitory computer-readable medium storing code for wireless communication, the code comprising instructions executable by a processor to perform a method of any of aspects 1 through 16.

Aspect 33: An apparatus for wireless communication, comprising a processor; memory coupled with the processor; and instructions stored in the memory and executable by the processor to cause the apparatus to perform a method of any of aspects 17 through 23.

Aspect 34: An apparatus for wireless communication, comprising at least one means for performing a method of any of aspects 17 through 23.

Aspect 35: A non-transitory computer-readable medium storing code for wireless communication, the code comprising instructions executable by a processor to perform a method of any of aspects 17 through 23.

Aspect 36: An apparatus for wireless communication, comprising a processor; memory coupled with the processor; and instructions stored in the memory and executable by the processor to cause the apparatus to perform a method of any of aspects 24 through 29.

Aspect 37: An apparatus for wireless communication, comprising at least one means for performing a method of any of aspects 24 through 29.

Aspect 38: A non-transitory computer-readable medium storing code for wireless communication, the code comprising instructions executable by a processor to perform a method of any of aspects 24 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   one or more memories storing processor-executable code; and
   one or more processors coupled with the one or more memories and operable to execute the code to cause the apparatus to:
      receive, from a transmitting device, capability information indicating whether or not the transmitting device supports PAPR reduction;
      evaluate peak-to-average power ratio (PAPR) for communications from a set of user equipments (UEs) for a time interval, wherein the set of UEs communicate with the apparatus via a relay device; and transmit, to the transmitting device, an indication of a configuration for PAPR reduction signals that is based at least in part on receiving the capability information associated with support of PAPR reduction and evaluating the PAPR;
   wherein the set of UEs comprises a plurality of UEs, and wherein:
      to evaluate PAPR for the communications from the set of UEs, the one or more processors are operable to execute the code to cause the apparatus to evaluate PAPR for a composite signal that includes respective communications from each UE of the plurality of UEs for the time interval; and
      to transmit the indication of the configuration for PAPR reduction signals, the one or more processors are operable to execute the code to cause the apparatus to transmit an indication of a cell-specific or group-specific PAPR reduction scheme based at least in part on evaluating PAPR for the composite signal.

2. The apparatus of claim 1, wherein the one or more processors are further operable to execute the code to cause the apparatus to:
   transmit, to the transmitting device, a request for capability information; and
   receive the capability information associated with support of PAPR reduction based at least in part on transmitting the request for capability information.

3. The apparatus of claim 1, wherein, to transmit the indication of the configuration for PAPR reduction signals, the one or more processors are operable to execute the code to cause the apparatus to:
   transmit, to one or more UEs of the set of UEs, an indication of PAPR reduction signals for transmission during the time interval by the one or more UEs of the set of UEs.

4. The apparatus of claim 1, wherein, to transmit the indication of the configuration for PAPR reduction signals, the one or more processors are operable to execute the code to cause the apparatus to:

transmit, to the relay device, an indication of PAPR reduction signals for transmission during the time interval by the relay device.

5. The apparatus of claim 1, wherein the configuration for PAPR reduction signals is based at least in part on a bandwidth of the communications from the set of UEs, or a transmission bandwidth of the relay device.

6. The apparatus of claim 1, wherein the configuration for PAPR reduction signals is based at least in part on a UE capability associated with PAPR reduction, or a PAPR target for a transmission by the relay device, or a PAPR reduction capability or a PAPR target for a reception by the relay device, or a combination thereof.

7. The apparatus of claim 1, wherein the configuration for PAPR reduction signals is based at least in part on a numerology, a waveform, an adjacent channel leakage ratio, a guard band configuration, a UE capability indication, a UE power class, a bandwidth of an active bandwidth part, a number of transmit antennas, a link budget or coverage requirement, or a combination thereof.

8. An apparatus for wireless communication, comprising:
one or more memories storing processor-executable code; and
one or more processors coupled with the one or more memories and operable to execute the code to cause the apparatus to:
receive, from a transmitting device, capability information associated with support of PAPR reduction;
evaluate peak-to-average power ratio (PAPR) for communications from a set of user equipments (UEs) for a time interval, wherein the set of UEs communicate with the apparatus via a relay device; and transmit, to the transmitting device, an indication of a configuration for PAPR reduction signals that is based at least in part on receiving the capability information associated with support of PAPR reduction and evaluating the PAPR;
wherein, to transmit the indication of the configuration for PAPR reduction signals, the one or more processors are operable to execute the code to cause the apparatus to:
transmit, to one or more UEs of the set of UEs, an indication of PAPR reduction signals for transmission during the time interval by the one or more UEs of the set of UEs; and
Wherein the one or more processors are further operable to execute the code to cause the apparatus to:
transmit, to each UE of the one or more UEs, a first uplink grant associated with a portion of the communications from the each UE for the time interval and a second uplink grant comprising the indication of PAPR reduction signals for transmission during the time interval.

9. An apparatus for wireless communication, comprising:
one or more memories storing processor-executable code; and
one or more processors coupled with the one or more memories and operable to execute the code to cause the apparatus to:
receive, from a transmitting device, capability information associated with support of PAPR reduction;
evaluate peak-to-average power ratio (PAPR) for communications from a set of user equipments (UEs) for a time interval, wherein the set of UEs communicate with the apparatus via a relay device; and transmit, to the transmitting device, an indication of a configuration for PAPR reduction signals that is based at least in part on receiving the capability information associated with support of PAPR reduction and evaluating the PAPR; and
wherein, to transmit the indication of the configuration for PAPR reduction signals, the one or more processors are operable to execute the code to cause the apparatus to:
transmit, to one or more UEs not included in the set of UEs, an indication of PAPR reduction signals for transmission during the time interval by the one or more UEs not included in the set of UEs.

10. An apparatus for wireless communication, comprising:
one or more memories storing processor-executable code; and
one or more processors coupled with the one or more memories and operable to execute the code to cause the apparatus to:
receive, from a transmitting device, capability information associated with support of PAPR reduction;
evaluate peak-to-average power ratio (PAPR) for communications from a set of user equipments (UEs) for a time interval, wherein the set of UEs communicate with the apparatus via a relay device; and transmit, to the transmitting device, an indication of a configuration for PAPR reduction signals that is based at least in part on receiving the capability information associated with support of PAPR reduction and evaluating the PAPR;
wherein, to transmit the indication of the configuration for PAPR reduction signals, the one or more processors are operable to execute the code to cause the apparatus to:
transmit, to a plurality of UEs, an indication of PAPR reduction signals for transmission during the time interval by each of the plurality of UEs using a same resource in a time domain and in a frequency domain.

11. An apparatus for wireless communication, comprising:
one or more memories storing processor-executable code; and
one or more processors coupled with the one or more memories and operable to execute the code to cause the apparatus to:
receive, from a transmitting device, capability information associated with support of PAPR reduction;
evaluate peak-to-average power ratio (PAPR) for communications from a set of user equipments (UEs) for a time interval, wherein the set of UEs communicate with the apparatus via a relay device; and transmit, to the transmitting device, an indication of a configuration for PAPR reduction signals that is based at least in part on receiving the capability information associated with support of PAPR reduction and evaluating the PAPR;
wherein the one or more processors are further operable to execute the code to cause the apparatus to:
receive, from the relay device, signals comprising the communications from the UEs and one or more PAPR reduction signals in accordance with the indicated configuration;
demultiplex communications signaling associated with the communications from the received signals; and
process the communications signaling independent of the one or more PAPR reduction signals to obtain data streams, control information, reference signals, or a combination thereof from the set of UEs.

12. An apparatus for wireless communication, comprising:

one or more memories storing processor-executable code; and
one or more processors coupled with the one or more memories and operable to execute the code to cause the apparatus to:
  transmit, to a network node, an indication of a capability of the apparatus to support PAPR reduction;
  receive a command from the network node to perform a peak-to-average power ratio (PAPR) reduction transmission to a relay device based at least in part on transmitting the indication of the capability of the apparatus to support PAPR reduction;
  generate a PAPR reduction signal for a time interval based at least in part on the received command; and
  transmit the generated PAPR reduction signal to the relay device during the time interval;
wherein the one or more processors are further operable to execute the code to cause the apparatus to:
  receive a first uplink grant associated with uplink communications from the apparatus to the relay device and a second uplink grant comprising the command to perform a PAPR reduction transmission to the relay device; and
  transmit, to the relay device, the generated PAPR reduction signal concurrently with the uplink communications.

13. The apparatus of claim 12, wherein the one or more processors are further operable to execute the code to cause the apparatus to:
  receive, from the network node, a request for capability information; and
  transmit, to the network node, the indication of the capability of the apparatus to support the PAPR reduction-based at least in part on receiving the request for capability information.

14. The apparatus of claim 12, wherein the first uplink grant indicates a first transmission power for communications from the apparatus to the relay device and the second uplink grant indicates a second transmission power for the generated PAPR reduction signal that is different than the first transmission power.

15. An apparatus for wireless communication, comprising:
one or more memories storing processor-executable code; and
one or more processors coupled with the one or more memories and operable to execute the code to cause the apparatus to:
  transmit, to a network node, an indication of a capability of the apparatus to support PAPR reduction;
  receive a command from the network node to perform a peak-to-average power ratio (PAPR) reduction transmission to a relay device based at least in part on transmitting the indication of the capability of the apparatus to support PAPR reduction;
  generate a PAPR reduction signal for a time interval based at least in part on the received command; and
  transmit the generated PAPR reduction signal to the relay device during the time interval;
wherein the command comprises an indication of a frequency for PAPR reduction signals, an indication of a power for PAPR reduction signals, an indication of a set of one or more symbols for PAPR reduction signals, an indication of a set of one or more resource elements for PAPR reduction signals, an indication of a set of one or more physical resource blocks for PAPR reduction signals, an indication of a set of one or more tones for PAPR reduction signals, or a combination thereof.

16. A method for wireless communication, comprising:
  receiving, at a network node from a transmitting device, capability information indicating whether or not the transmitting device supports PAPR reduction;
  evaluating, at the network node, peak-to-average power ratio (PAPR) for communications from a set of user equipments (UEs) for a time interval, wherein the set of UEs communicate with the network node via a relay device; and
  transmitting, by the network node and to the transmitting device, an indication of a configuration for PAPR reduction signals that is based at least in part on receiving the capability information associated with support of PAPR reduction and evaluating the PAPR;
  wherein the set of UEs comprises a plurality of UEs, and wherein:
    evaluating PAPR for the communications from the set of UEs comprises evaluating PAPR for a composite signal that includes respective communications from each UE of the plurality of UEs for the time interval; and
    transmitting the indication of the configuration for PAPR reduction signals comprises transmitting an indication of a cell-specific or group-specific PAPR reduction scheme based at least in part on evaluating PAPR for the composite signal.

17. The method of claim 16, wherein the configuration for PAPR reduction signals is based at least in part on a first bandwidth of the communications from the set of UEs or a second bandwidth of the communication from the relay device.

18. The method of claim 16, wherein the configuration for PAPR reduction signals is based at least in part on a UE capability associated with PAPR reduction, or a PAPR target for a transmission by the relay device, or a PAPR reduction capability or a PAPR target for a reception by the relay device, or a combination thereof.

19. The method of claim 16, wherein the configuration for PAPR reduction signals is based at least in part on a numerology, a waveform, an adjacent channel leakage ratio, a guard band configuration, a UE capability indication, a UE power class, a bandwidth of an active bandwidth part, a number of transmit antennas, a link budget or coverage requirement, or a combination thereof.

20. A method for wireless communication, comprising:
  receiving, at a network node from a transmitting device, capability information associated with support of PAPR reduction;
  evaluating, at the network node, peak-to-average power ratio (PAPR) for communications from a set of user equipments (UEs) for a time interval, wherein the set of UEs communicate with the network node via a relay device;
  transmitting, by the network node and to the transmitting device, an indication of a configuration for PAPR reduction signals that is based at least in part on receiving the capability information associated with support of PAPR reduction and evaluating the PAPR; and
  transmitting, to each UE of one or more UEs of the set of UEs, a first uplink grant associated with a portion of the communications from the each UE for the time interval and a second uplink grant comprising the indication of PAPR reduction signals for transmission during the time interval.

21. A method for wireless communication, comprising:

receiving, at a network node from a transmitting device, capability information associated with support of PAPR reduction;

evaluating, at the network node, peak-to-average power ratio (PAPR) for communications from a set of user equipments (UEs) for a time interval, wherein the set of UEs communicate with the network node via a relay device; and transmitting, by the network node and to the transmitting device, an indication of a configuration for PAPR reduction signals that is based at least in part on receiving the capability information associated with support of PAPR reduction and evaluating the PAPR;

wherein transmitting the indication of the configuration for PAPR reduction signals comprises:

transmitting, to a plurality of UEs, an indication of PAPR reduction signals for transmission during a first time interval by each of the plurality of UEs; and transmitting, to the relay device, an indication of PAPR reduction signals for transmission during a second time interval by the relay device.

22. A method for wireless communication, comprising:

receiving, at a network node from a transmitting device, capability information associated with support of PAPR reduction;

evaluating, at the network node, peak-to-average power ratio (PAPR) for communications from a set of user equipments (UEs) for a time interval, wherein the set of UEs communicate with the network node via a relay device;

transmitting, by the network node and to the transmitting device, an indication of a configuration for PAPR reduction signals that is based at least in part on receiving the capability information associated with support of PAPR reduction and evaluating the PAPR;

receiving, from the relay device, signals comprising the communications from the UEs and one or more PAPR reduction signals in accordance with the indicated configuration;

demultiplexing communications signaling associated with the communications from the received signals; and processing the communications signaling independent of the one or more PAPR reduction signals to obtain data streams, control information, reference signals, or a combination thereof from the set of UEs.

\* \* \* \* \*